United States Patent
Elliott et al.

(10) Patent No.: US 10,443,639 B1
(45) Date of Patent: Oct. 15, 2019

(54) SCREWLESS STRAP FOR SECURING METAL-BACKED WALLBOARD PANELS TO WALL STRUCTURE

(71) Applicants: Tyler Robert Elliott, Costa Mesa, CA (US); A. Carleton Elliott, Costa Mesa, CA (US)

(72) Inventors: Tyler Robert Elliott, Costa Mesa, CA (US); A. Carleton Elliott, Costa Mesa, CA (US)

( * ) Notice: Subject to any disclaimer, the term of this patent is extended or adjusted under 35 U.S.C. 154(b) by 0 days.

(21) Appl. No.: 16/352,643

(22) Filed: Mar. 13, 2019

Related U.S. Application Data

(60) Provisional application No. 62/714,311, filed on Aug. 3, 2018.

(51) Int. Cl.
| | |
|---|---|
| *F16B 5/12* | (2006.01) |
| *E04G 21/14* | (2006.01) |
| *E04B 2/28* | (2006.01) |
| E04B 2/00 | (2006.01) |
| E04C 2/08 | (2006.01) |
| E04B 2/58 | (2006.01) |

(52) U.S. Cl.
CPC ............... *F16B 5/125* (2013.01); *E04B 2/28* (2013.01); *E04G 21/14* (2013.01); *E04B 2/58* (2013.01); *E04C 2/08* (2013.01); *E04C 2/46* (2013.01)

(58) Field of Classification Search
CPC ... F16B 5/125; E04B 2/28; E04B 2/58; E04G 21/14; E04C 2/46; E04C 2/08

USPC .................................... 52/289, 387, 489.2
See application file for complete search history.

(56) References Cited

U.S. PATENT DOCUMENTS

| | | | |
|---|---|---|---|
| 4,223,505 A * | 9/1980 | Krebel | E04F 13/0823 52/489.2 |
| 5,768,841 A | 6/1998 | Swartz et al. | |
| 6,266,937 B1 * | 7/2001 | Watanabe | E04F 13/0826 24/292 |
| 8,056,301 B2 | 11/2011 | Elliott, Jr. et al. | |
| 9,574,341 B2 * | 2/2017 | Ciuperca | E04B 1/625 |
| 9,745,739 B2 * | 8/2017 | Riepe | E04B 1/7604 |

* cited by examiner

*Primary Examiner* — Patrick J Maestri
(74) *Attorney, Agent, or Firm* — Patterson Intellectual Property Law, P.C.; Jerry Turner Sewell

(57) ABSTRACT

A system secures adjacent edges of a first metal-backed wallboard panel and a second metal-backed wallboard panel on a wall structure having spaced-apart metal studs. The system includes a strap having a first surface and a second surface. The strap has a length selected to extend at least between a first metal stud and a second metal stud. The strap includes a plurality of partial cutouts. Each partial cutout includes a transverse portion and a stem portion. The transverse portion has a proximal edge. The stem portion has a first end connected to the proximal edge of the transverse portion and has a second end connected to the strap. The second end extends from the first surface of the strap such that the proximal edge of the transverse portion is parallel to the surface and is spaced apart from the surface by a selected gap distance.

10 Claims, 19 Drawing Sheets

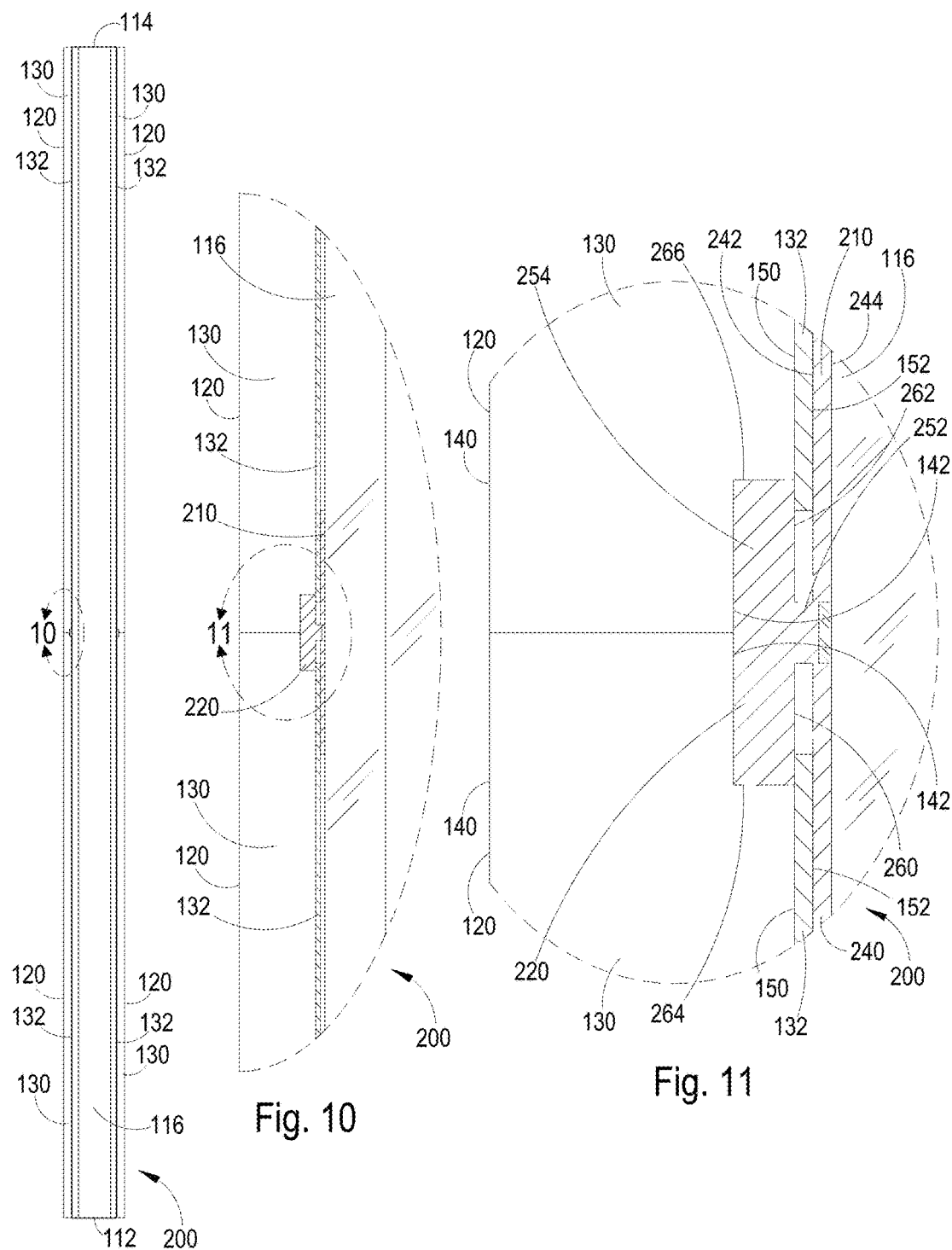

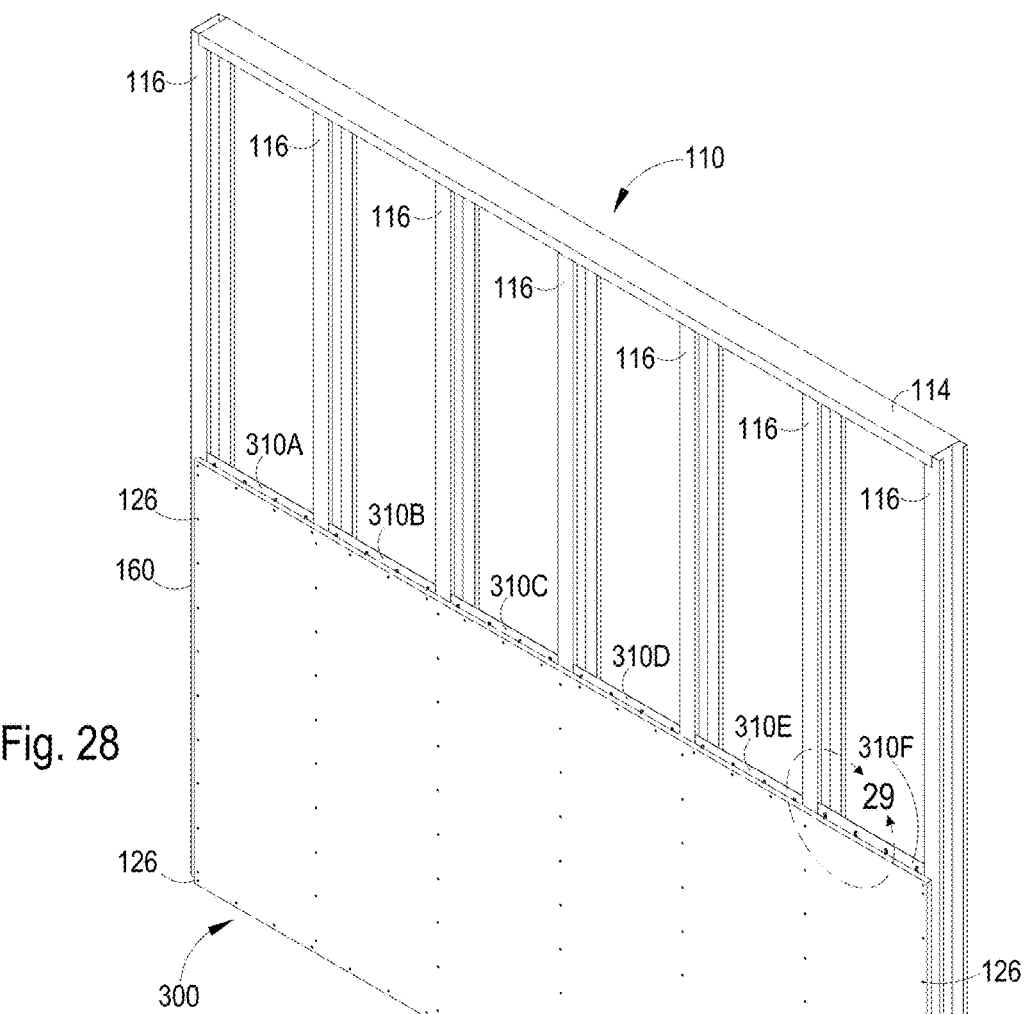
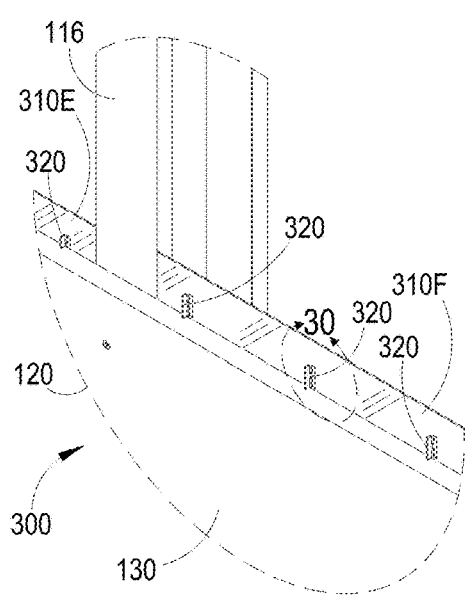
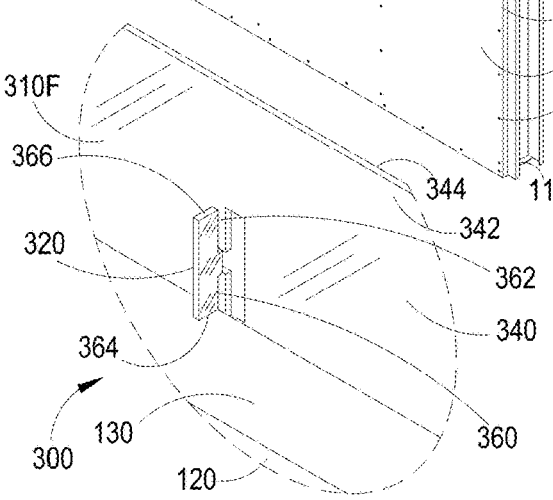
Fig. 28
Fig. 29
Fig. 30

SCREWLESS STRAP FOR SECURING METAL-BACKED WALLBOARD PANELS TO WALL STRUCTURE

RELATED APPLICATIONS

This application claims the benefit of priority under 35 USC § 119(e) of U.S. Provisional Application No. 62/714,311 filed on Aug. 3, 2018, which is incorporated herein by reference in its entirety.

FIELD OF THE INVENTION

The present invention is in the field of wall construction, and, more particularly, is in the field of installing of a metal-backed wallboard panel onto a wall structure framed with metal studs.

BACKGROUND

Stud-framed walls are commonly used to enclose residences, offices and other structures. Stud-framed walls are also used to subdivide residence, offices and other structures into rooms within an outer enclosure. Basically, a stud-framed wall comprises a plurality of vertical studs positioned between a lower plate and an upper header. In wood-framed structures, the lower plate and the upper header each comprise one or more horizontally positioned lengths of lumber. The bottom and top ends of solid wood vertical studs are nailed or otherwise fastened to the lower plate and to the upper header. In metal-framed walls, the lower plate and the upper header are replaced with U-shaped channels; and the vertical studs comprise so-called C-shaped metal studs. Each metal stud has a web that defines the width of the stud and a flange that defines the "thickness" of the stud. Each metal stud further includes a lip/return that extends inward for a short distance from each flange in parallel with the web to increase the rigidity of the metal stud. The metal studs are secured to the upper and lower U-shaped panels by sheet metal screws or other suitable fasteners. Metal studs are available in various gauges ranging from 20 gauge (0.033 inch thickness) to 12 gauge (0.097 inch thickness).

After the framing of a wall is completed, the walls are covered with wall panels by securing the wall panels to the vertical studs and to the upper and lower channels. In many common wall structures, the wall panels comprise conventional wallboard panels such as drywall. Drywall, which is also known as gypsum board and plasterboard, commonly comprises a noncombustible core of gypsum or other suitable material with a paper backing on the front and back surfaces and on the edges. The wallboard panels described herein modify conventional drywall by including a thin sheet of metal on the back surface of the gypsum core. The thin sheet of metal is adhesively secured to the gypsum core under pressure such that the sheet of metal permanently attached to the gypsum core and provides a uniformly smooth rear surface. The sheet of metal has approximately the same planar dimensions as the gypsum core except that the horizontal and vertical dimensions are slightly smaller than the corresponding dimensions of the gypsum core. With the sheet of metal centered on the gypsum core, the edges of the sheet of metal are displaced inwardly from the edges of the gypsum core by approximately ¼ inch. Accordingly, the metal-backed wallboard panel can be handled safely in view of the rim of the gypsum core around the metal edges. The metal-backed wallboard panel is described in more detail in U.S. Pat. No. 5,768,841, which is incorporated herein by reference in its entirety.

A typical wall comprises a plurality of wall panels positioned adjacent to each other side-by-side with the long edges of each panel oriented vertically. In such installations, a vertical seam between two horizontally adjacent wall panels is aligned with a vertical stud such that both wall panels are secured to the stud and such that the vertical seam is blocked entirely by the vertical stud. In certain wall installations, the wall panels may be stacked with one panel positioned above another panel. In such installations, a horizontal seam is formed between two vertically adjacent wall panels. The horizontal seam extends from one vertical stud to an adjacent vertical stud. The front portion of the seam on the exposed front sides of the wall panels may be covered with wallboard joint tape and joint compound; however, the rear portion of the seam on the sides of the wall panels against the studs remains open. Furthermore, the horizontal edges of the wall panels between adjacent vertical studs have no underlying support. Absent such support, the portions of the two adjacent wallboard panels between adjacent wall studs may move with respect to each other and dislodge and tape and compound forming the front seam. In wood-frame wall structures, the rear portion of the seam may be covered and the horizontal edges of the wall panels may be supported by adding a horizontal brace between each pair of adjacent wall studs. Such a brace may be easily added to the wall structure by toenailing the brace to each of the adjacent wall studs. However, such braces are not easily added to a metal-framed wall structure. The lip/return of a typical C-stud does not provide sufficient area to allow a horizontal brace to be attached.

SUMMARY

In view of the foregoing, a need exists for a structure and method for blocking the rear portion of the horizontal seam between two vertically adjacent wallboard panels and for securing the adjacent wallboard panels in a fixed relationship to each other at the horizontal seam.

One aspect of the embodiments disclosed herein is a system that secures adjacent edges of a first metal-backed wallboard panel and a second metal-backed wallboard panel on a wall structure having spaced-apart metal studs. The system includes a strap having a first surface and a second surface. The strap has a length selected to extend at least between a first metal stud and a second metal stud. The strap includes a plurality of partial cutouts. Each partial cutout includes a transverse portion and a stem portion. The transverse portion has a proximal edge. The stem portion has a first end connected to the proximal edge of the transverse portion and has a second end connected to the strap. The second end extends from the first surface of the strap such that the proximal edge of the transverse portion is parallel to the surface and is spaced apart from the surface by a selected gap distance Another aspect of the embodiments disclosed herein is a system for securing adjacent edges of a first metal-backed wallboard panel and a second metal-backed wallboard panel on a wall structure having a plurality of spaced-apart metal studs. The system comprises a strap having a first surface and a second surface. The strap has a length selected to extend at least between a first metal stud and a second metal stud. The strap includes a plurality of partial cutouts. Each partial cutout includes a transverse portion and a stem portion. The transverse portion has a first engagement edge and a second engagement edge. The stem portion has a first end connected to the first engagement edge and the second engagement edge of the transverse portion and has a second end connected to the strap. The second end of the stem portion extends substantially vertically from the first surface of the strap such that the first engagement edge and the second engagement edge of the transverse portion are spaced apart from the first surface of the strap by at least a selected gap distance. In certain embodiments in accordance with this aspect, the first engagement edge and the second engagement edge of the transverse portion are perpendicular to the stem portion and are parallel to the first surface of the strap. In certain embodiments in accordance with this aspect, each of the first engagement edge and the second engagement edge of the transverse portion extends at a respective angle with respect to the stem portion from a respective proximal end of the respective engagement edge at the stem portion to a respective distal end of the respective engagement edge. The respective proximal end of each of the first engagement edge and the second engagement edge is spaced apart from the first surface of the strap by the selected gap distance. The respective distal end of each of the first engagement edge and the second engagement edge is spaced apart from the first surface of the strap by a distance greater than the selected gap distance. In certain embodiments in accordance with this aspect, the selected gap distance is approximately the same as a thickness of a metal backing on the metal-backed wallboard panel.

Another aspect of the embodiments disclosed herein is a strap for spanning between two adjacent metal-backed wallboard panels on a wall structure. The strap comprises a metal sheet having a first surface and a second surface. Punched-out tabs are spaced apart along the first surface of the metal sheet. Each tab comprises a stem portion having a proximal end attached to the metal sheet and having a distal end. The stem portion has a stem width. The proximal end of the stem has a bend such that the distal end of the stem extends substantially perpendicularly with respect to the first surface of the metal sheet. Each tab further includes an engagement portion that extends bidirectionally transversely from the distal end of the stem portion. At least a portion of the engagement portion has a width greater than the stem portion. The engagement portion has a first engagement edge extending in a first direction from the distal end of the stem portion and has a second engagement edge extending in a second direction from the distal end of the stem portion. The second direction is opposite the first direction. The first and second engagement edges are spaced apart from the first surface of the metal sheet by at least a selected distance. In certain embodiments in accordance with this aspect, the first engagement edge and the second engagement edge of the transverse portion are perpendicular to the stem portion and are parallel to the first surface of the strap. In certain embodiments in accordance with this aspect, each of the first engagement edge and the second engagement edge of the transverse portion extend at a respective angle with respect to the stem portion from a respective proximal end of the respective engagement edge at the stem portion to a respective distal end of the respective engagement edge. The respective proximal end of each of the first engagement edge and the second engagement edge is spaced apart from the first surface of the strap by the selected gap distance. The respective distal end of each of the first engagement edge and the second engagement edge spaced is apart from the first surface of the strap by a distance greater than the selected gap distance. In certain embodiments in accordance with this aspect, the selected gap distance is approximately the same as a thickness of a metal backing on the metal-backed wallboard panel.

Another aspect of the embodiments disclosed herein is a method for closing a horizontal gap between two adjacent metal-backed wallboard panels on a wall structure. Each wallboard panel includes a drywall panel with a metal sheet adhesively secured to the drywall panel. The method comprises positioning a first metal-backed wallboard panel on a first portion of the wall structure. The method further includes positioning an engagement strap on an upper horizontal edge of the first metal-backed wallboard panel. The engagement strap includes a plurality of engagement tabs extending from a strap surface. Each engagement tab has a first engagement edge and a second engagement edge. The engagement strap is positioned with at least a portion of the first engagement edge of each engagement tab positioned adjacent the metal sheet of the first metal-backed wallboard panel with an edge of the metal sheet positioned between the first engagement edge and the strap surface. The method further comprises positioning a lower horizontal edge of a second metal-backed wallboard panel on the engagement strap. The second metal-backed wallboard panel is positioned with at least a portion of the second engagement edge of each engagement tab positioned adjacent the metal sheet of the second metal-backed wallboard panel with the metal sheet positioned between the second engagement edge and the strap surface. In certain embodiments in accordance with this aspect, the method further comprises securing the first metal-backed wallboard panel and the second metal backed wallboard panel to the engagement strap with a plurality of screws. In certain embodiments in accordance with this aspect, the first engagement edge and the second engagement edge of the engagement tab are parallel to the strap surface. In certain embodiments in accordance with this aspect, each of the first engagement edge and the second engagement edge of the engagement tab is oriented at respective angles to the strap surface. In certain embodiments in accordance with this aspect, at least a portion of each of the first engagement edge and the second engagement edge is spaced apart from the strap surface by a selected gap distance. The selected gap distance is approximately the same as a thickness of a metal backing on the metal-backed wallboard panel.

BRIEF DESCRIPTIONS OF THE DRAWINGS

The foregoing aspects and other aspects of the disclosure are described in detail below in connection with the accompanying drawings in which:

FIG. 9 is a cross-sectional right elevational view of the wallboard panels and the metal framing taken along the line 9-9 in FIG. 8;

FIG. 10 is an enlarged cross-sectional elevational view taken within the area—10—in FIG. 9 to show an engagement tab on the horizontal wallboard engagement strap in more detail;

FIG. 11 is a further enlarged cross-sectional elevational view taken within the area—11—in FIG. 10 to show the engagement tab in further detail;

Figure 1:
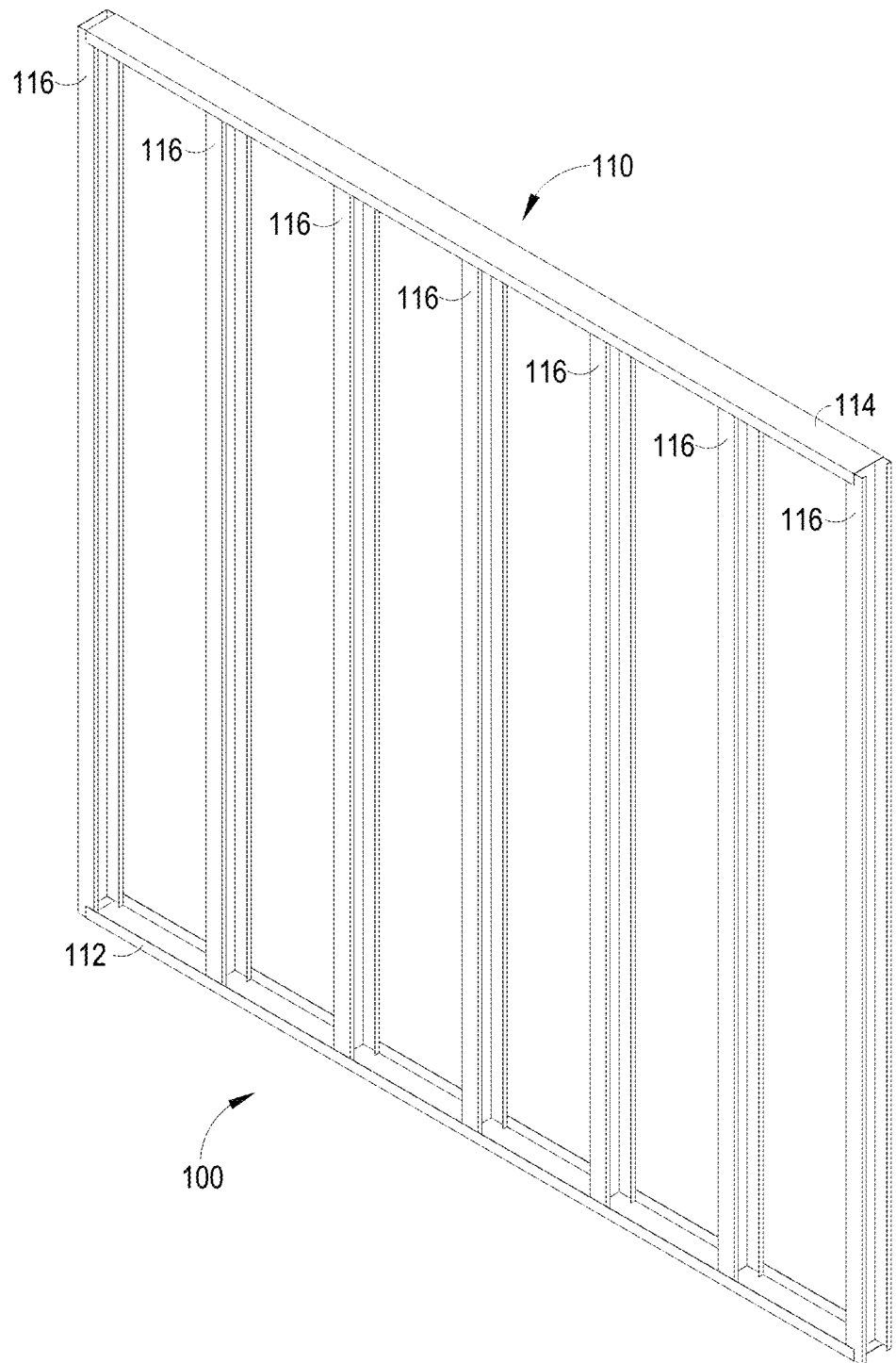
FIG. 1 is a perspective view of an example of the metal framing for a wall structure.
Figure 7:
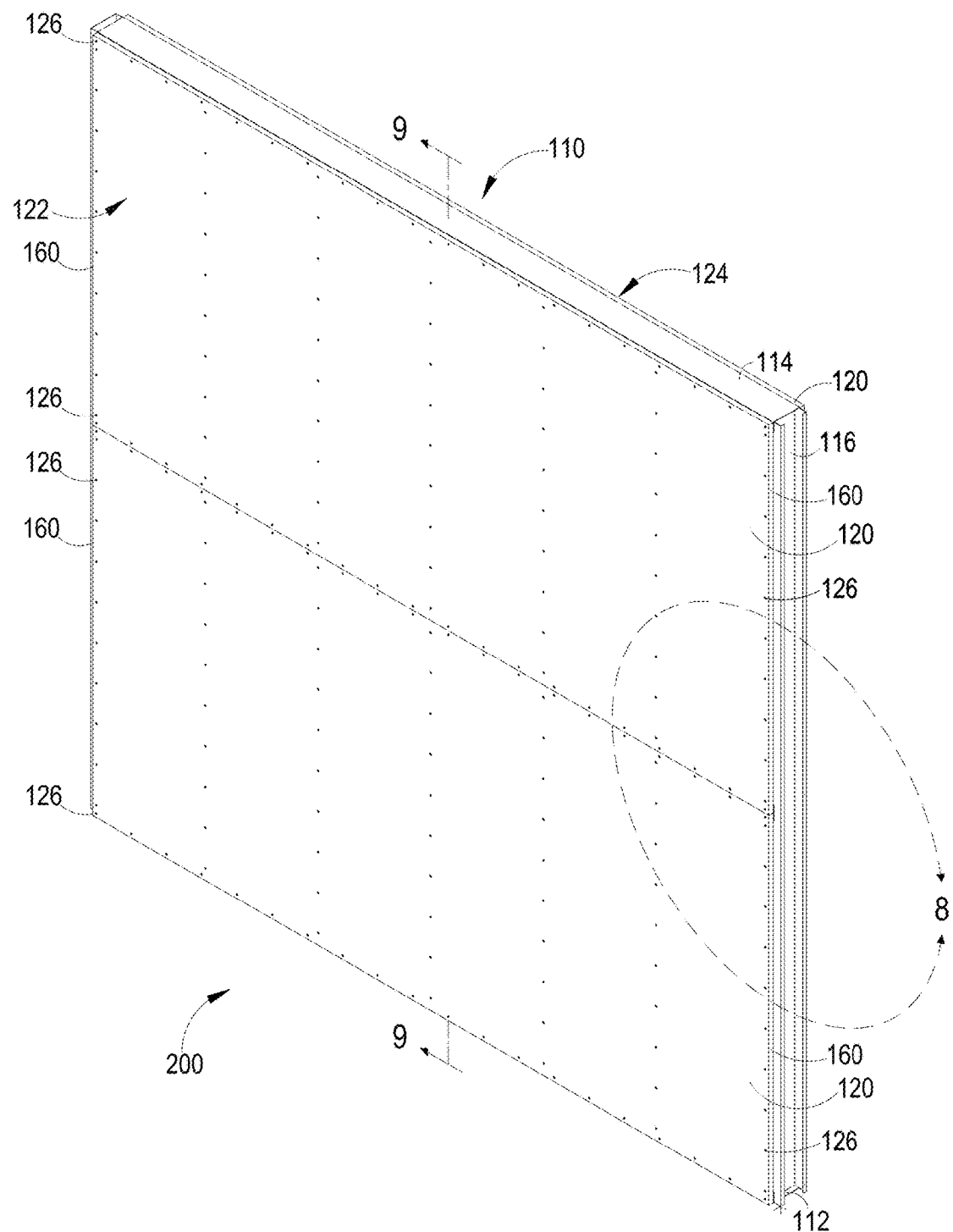
FIG. 7 is a perspective view of a wall structure in accordance with an embodiment disclosed herein.
Figure 17:
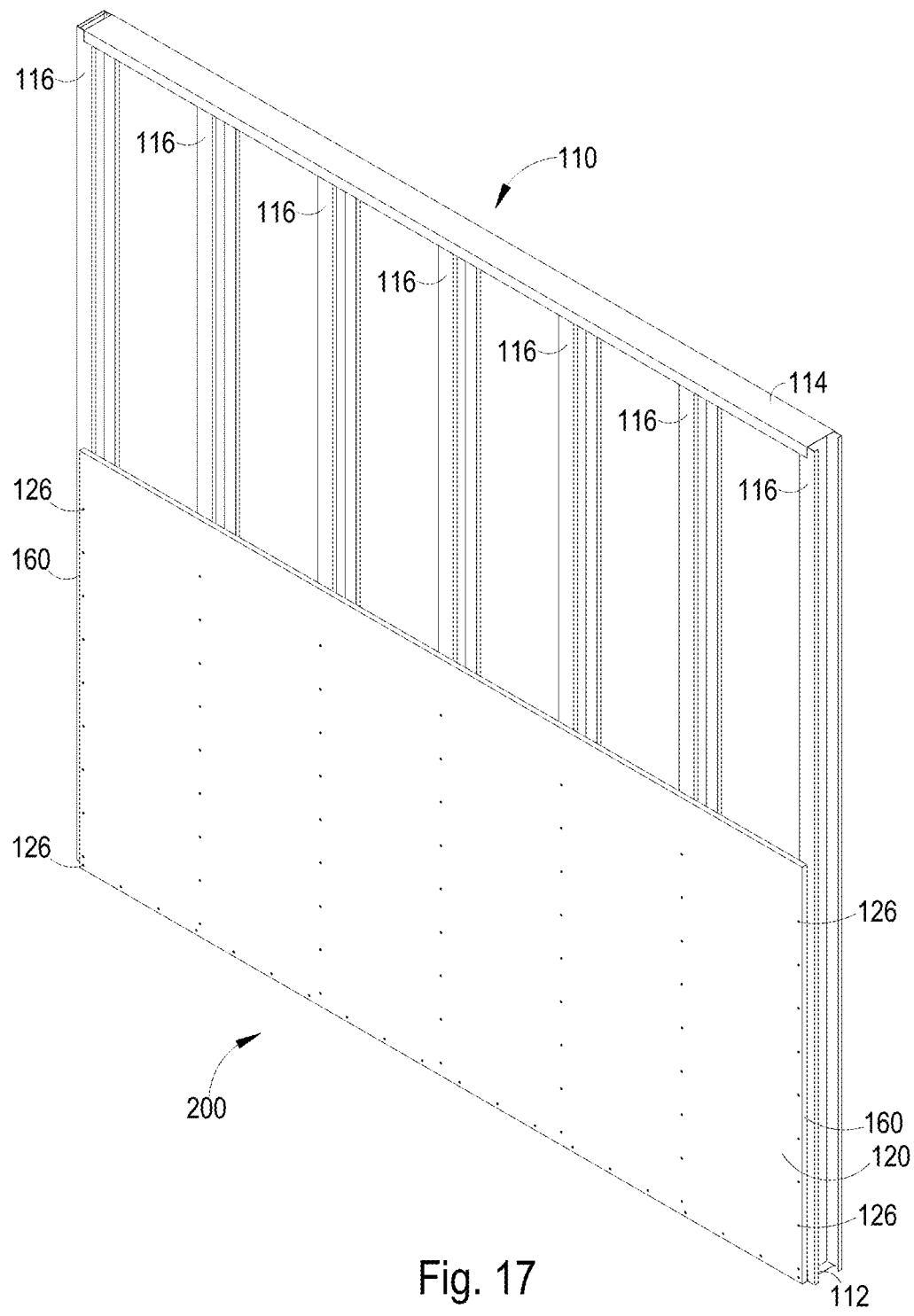
Figure 18:
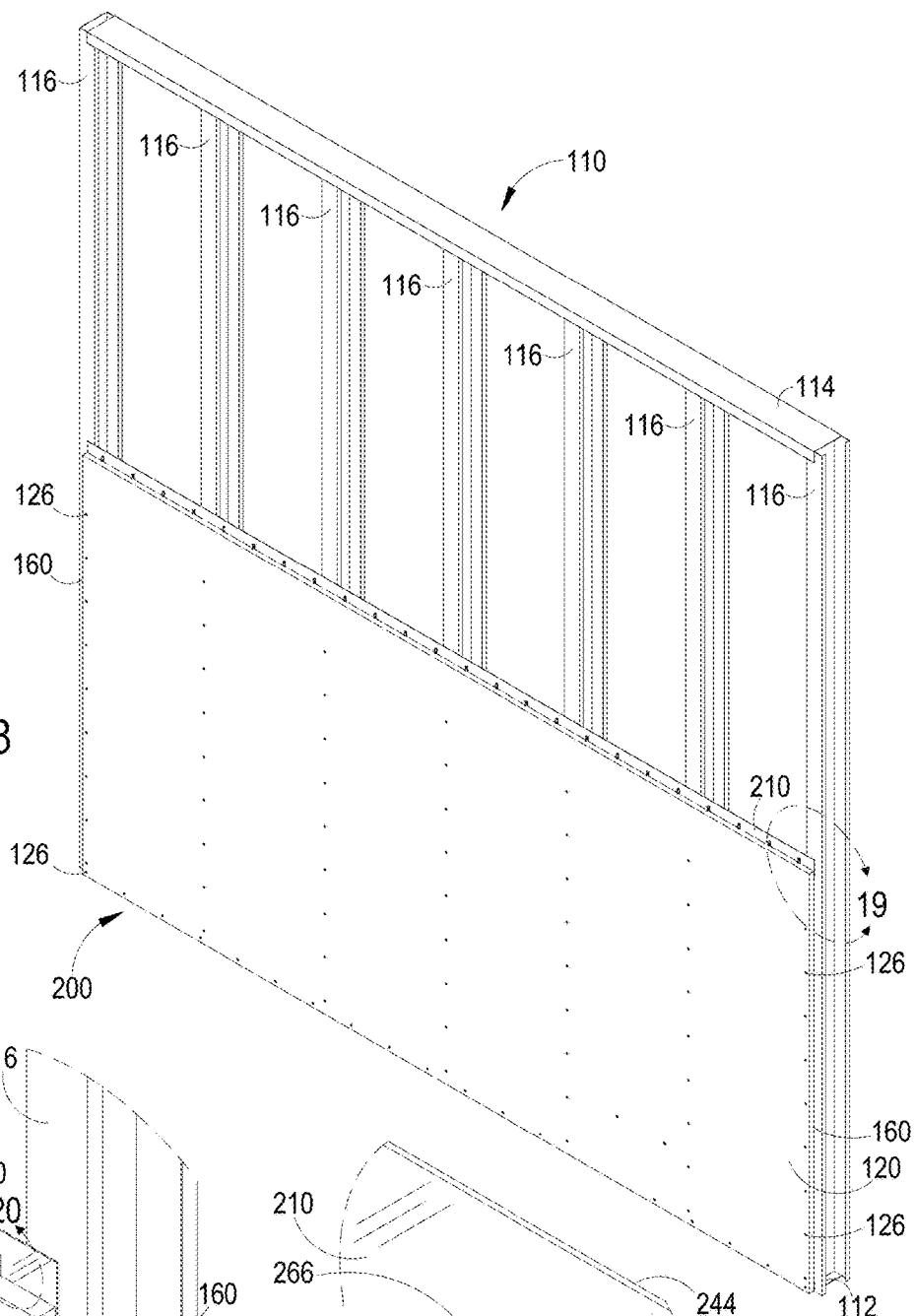
Figure 19:
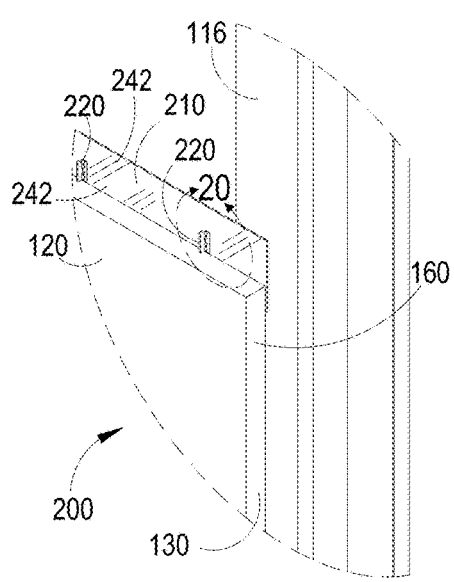
Figure 20:
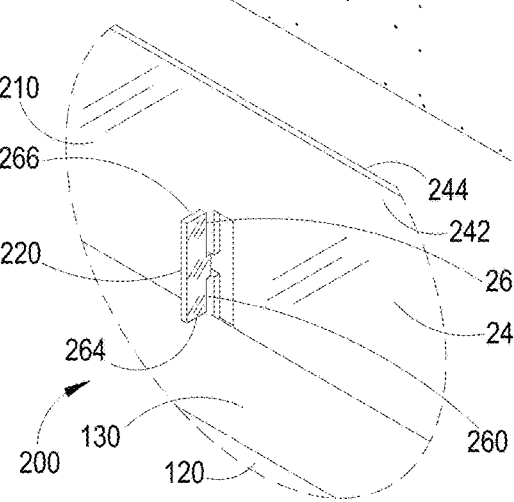
Figure 21:
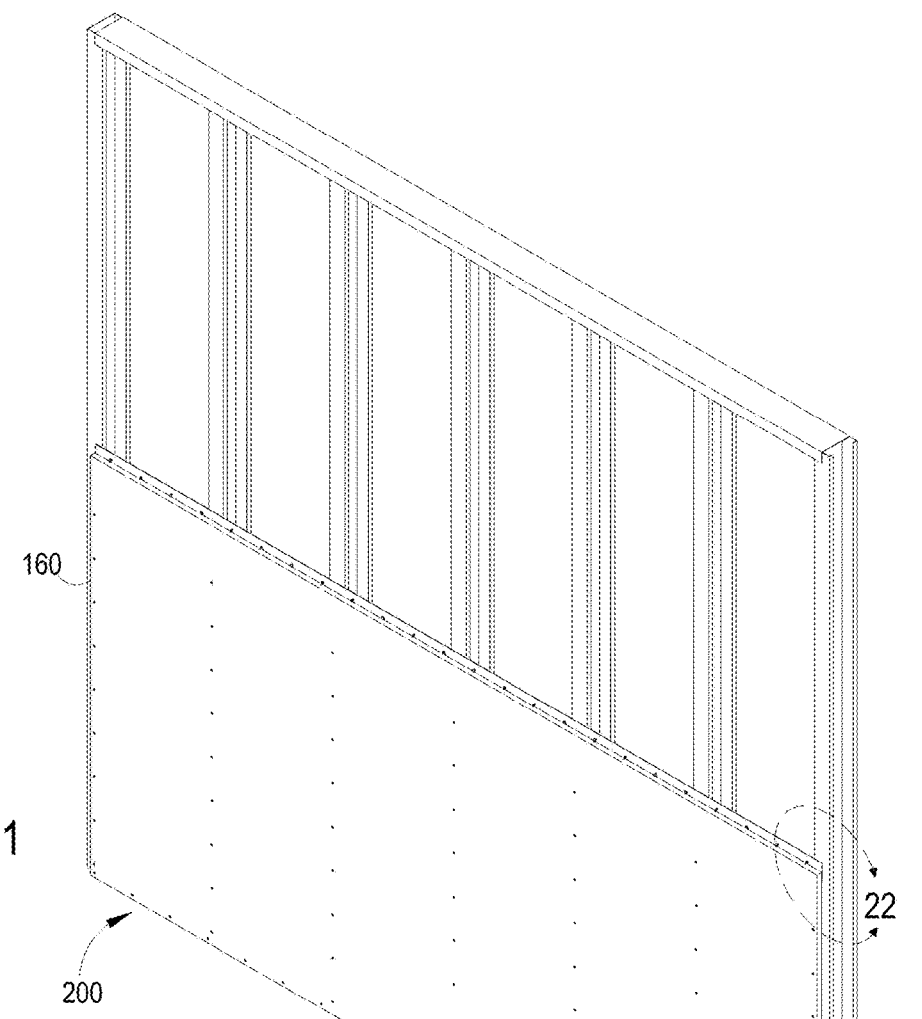
Figure 22:
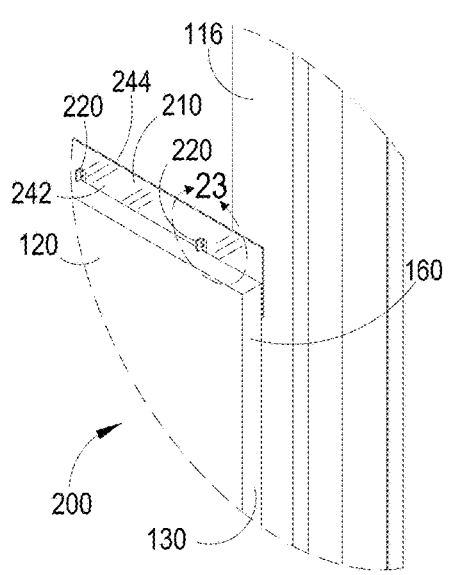
Figure 23:
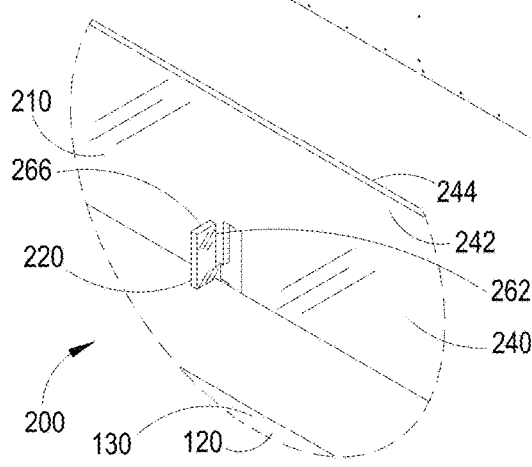
Figure 24:
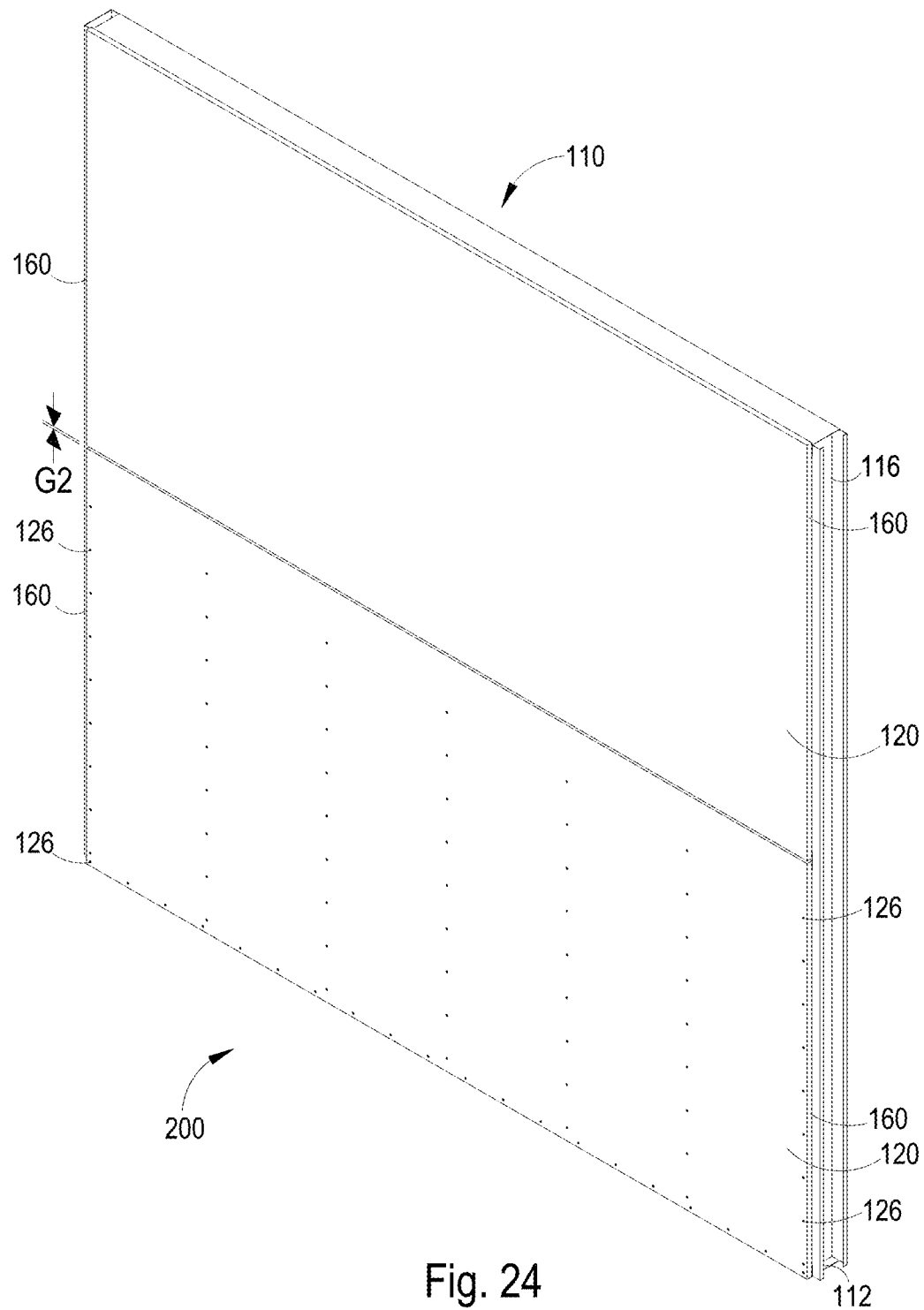
Figure 25:
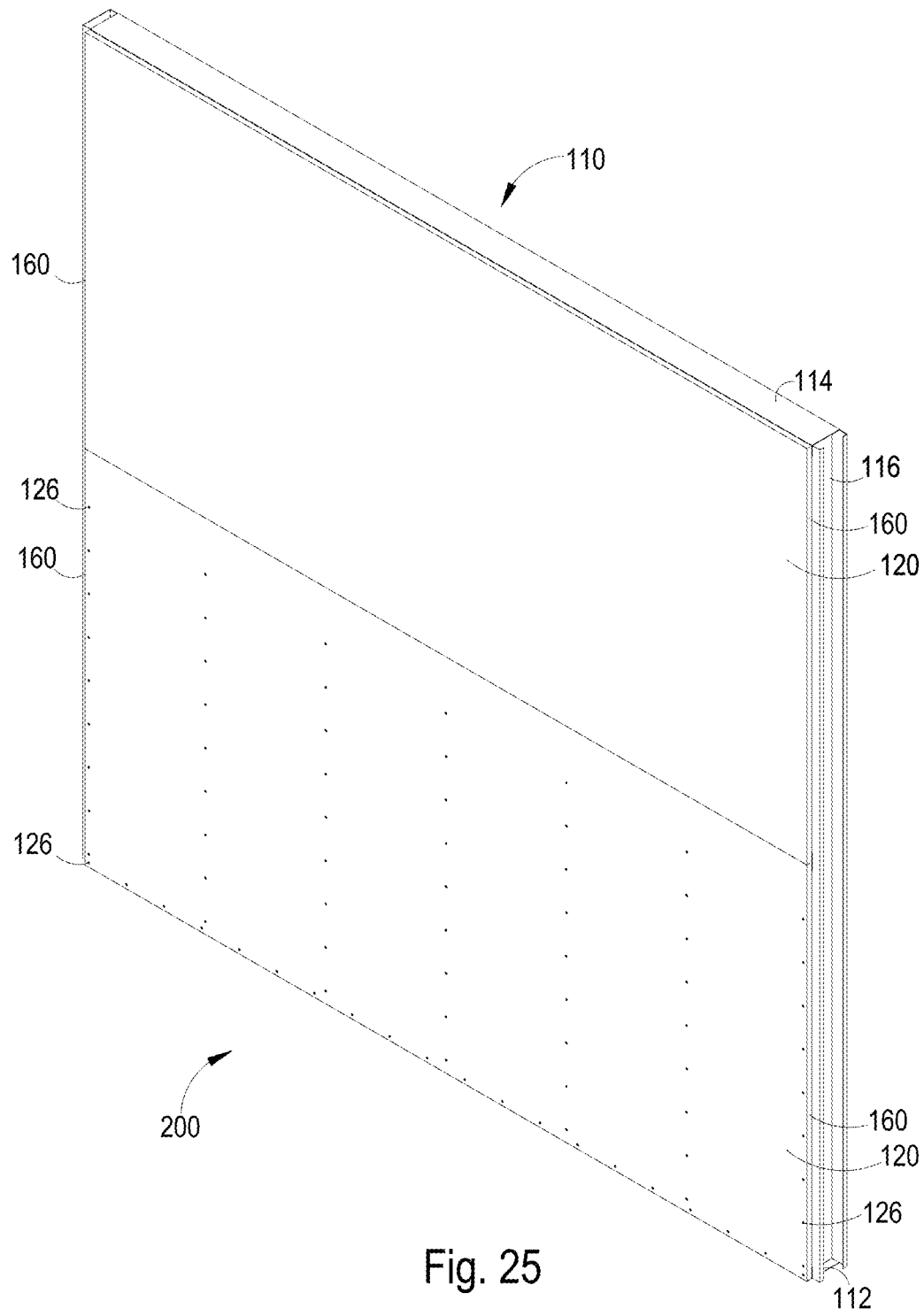
Figure 26:
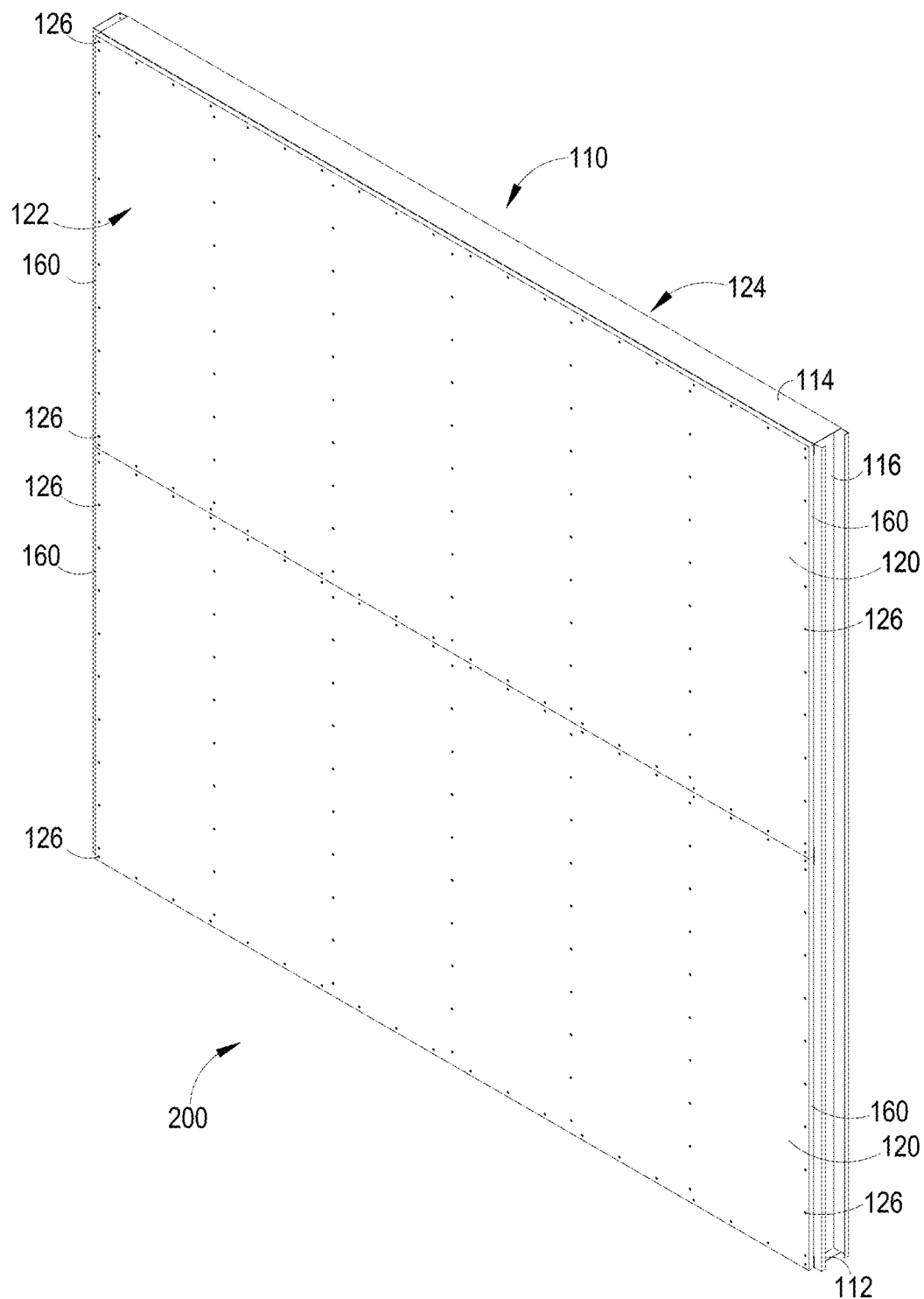
Figure 27:
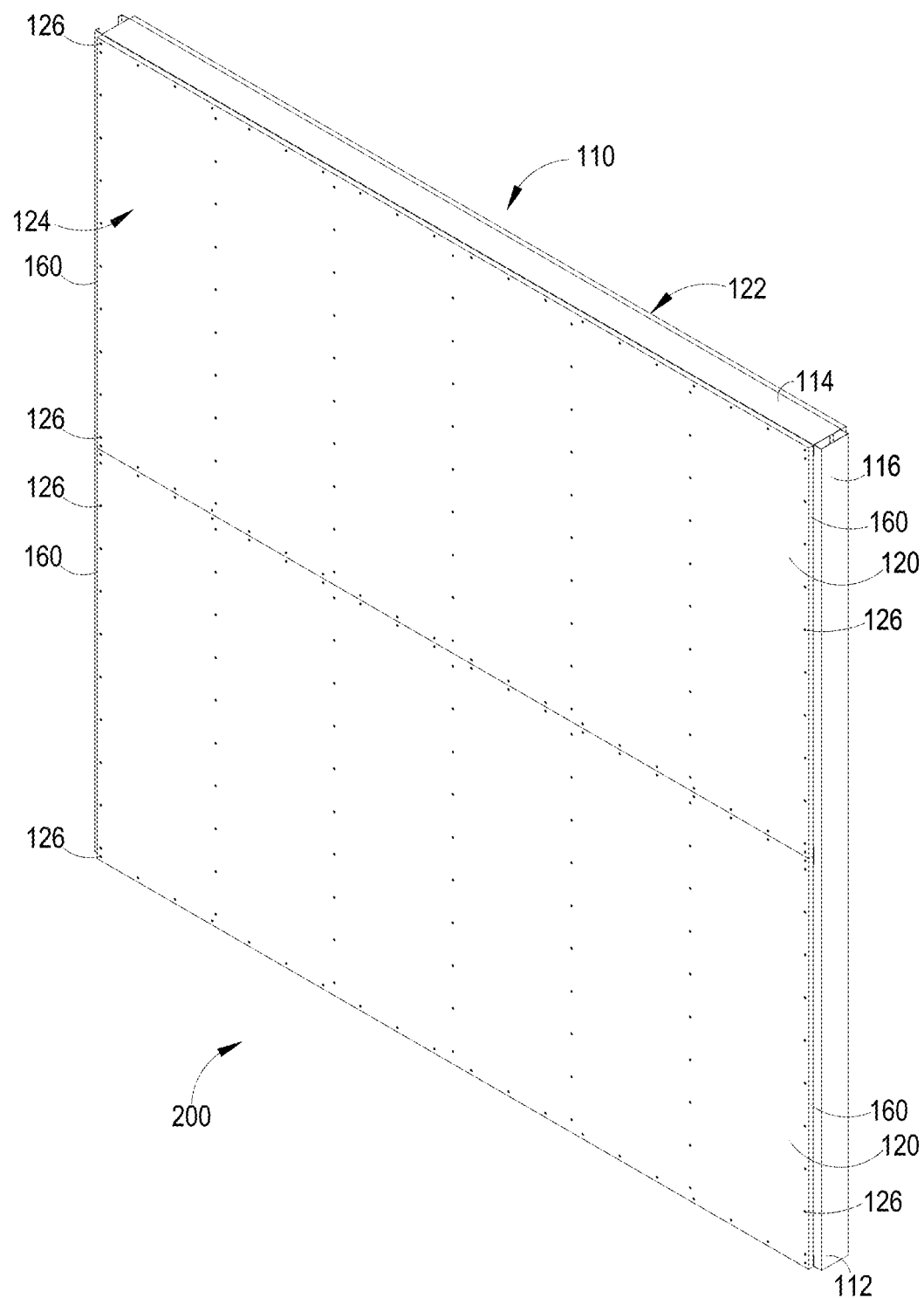
Figure 31:
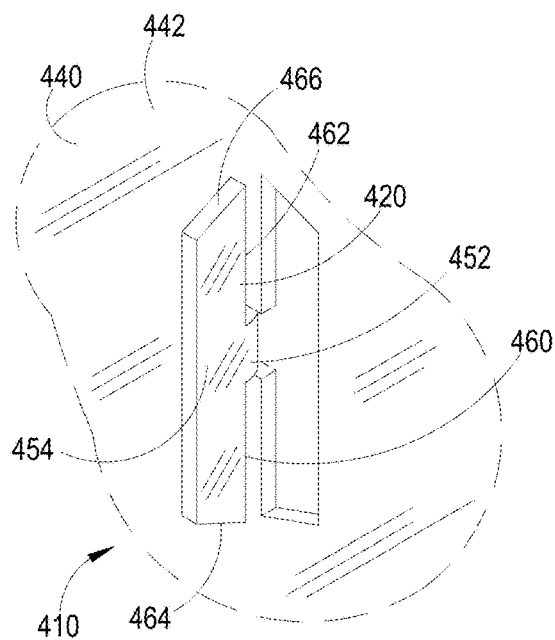
Figure 32:
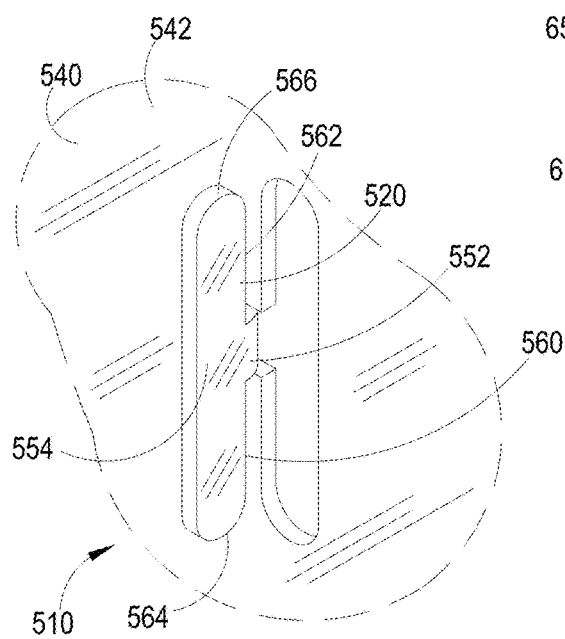
Figure 33:
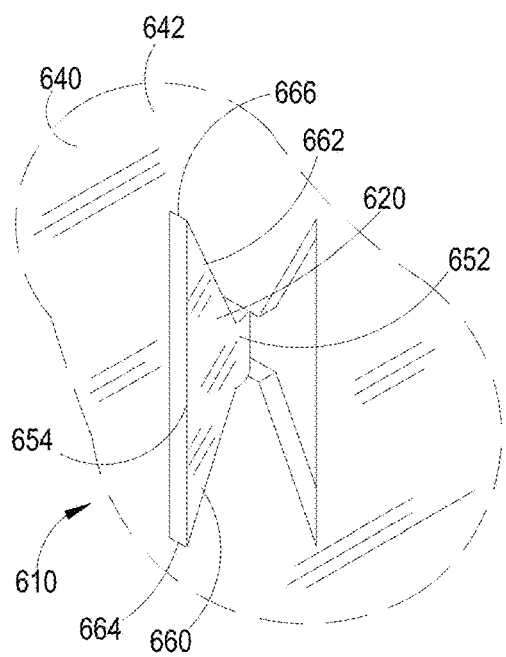

FIG. 17 is a perspective view of the metal framing of FIG. 1 with a first wallboard panel partially secured to a lower portion of the front of the metal framing, the wallboard panel having the drywall screws proximate to the upper edge uninstalled to allow the upper edge to flex, the view in FIG. 17 representing a first stage of the construction of the front surface of the wall structure shown in FIG. 7;

FIG. 18 is a perspective view of the wall structure of FIG. 17 with the horizontal wallboard engagement strap positioned with a lower portion of the strap positioned between the wallboard panel and the studs of the metal framing and with lower ends of each engagement tab resting on the top edge of the wallboard panel, the view in FIG. 18 representing the beginning of a second stage of the construction of the front surface of the wall structure of FIG. 7;

FIG. 19 is an enlarged perspective view of the wall structure of FIG. 18 taken within the area—19—in FIG. 18 showing the positioning of the engagement tabs in more detail;

FIG. 20 is a further enlarged perspective view of the wall structure of FIG. 19 taken within the area—20—in FIG. 19 showing the positioning of one of the engagement tabs in further detail;

FIG. 21 is a perspective view of the wall structure of FIG. 18 with the horizontal wallboard engagement strap positioned with the lower portion of the strap positioned between the wallboard panel and the studs of the metal framing and with the engagement strap forced lower to cause the lower ends of each engagement tab to be forced into the upper edge of the drywall panel, the view in FIG. 21 representing a continuation of the second stage of the construction of the front surface of the wall structure of FIG. 7;

FIG. 22 is an enlarged perspective view of the wall structure of FIG. 21 taken within the area—22—in FIG. 21 showing the positioning of the engagement tabs in more detail;

FIG. 23 is a further enlarged perspective view of the wall structure of FIG. 22 taken within the area—23—in FIG. 22 showing the positioning of one of the engagement tabs in further detail;

FIG. 24 is a perspective view of the wall structure of FIG. 21 with an upper wallboard panel positioned above the lower wallboard panel with the lower edge of the upper wallboard panel initially resting on the tops of the engagement tabs of the horizontal wallboard engagement strap, the view in FIG. 24 showing the beginning of a third stage of the construction of the front surface of the wall structure of FIG. 7;

FIG. 25 is a perspective view of the wall structure of FIG. 24 with the upper wallboard panel forced downward to cause the upper portions of the engagement tabs of the horizontal wallboard engagement strap to be forced into the lower edge of the upper wallboard panel, the view in FIG. 25 showing the continuation of the third stage of the construction of the front surface of the wall structure of FIG. 7;

FIG. 26 is a perspective view of the wall structure of FIG. 25 with the upper wallboard panel secured to the studs of the metal framing, with the previously omitted drywall screws of the upper portion of the lower wallboard panel secured to the studs, and with respective portions of the lower wallboard panel and the upper wallboard panel secured to the horizontal wallboard engagement strap, the securing of the two wallboard panels completing the third stage of construction of the front surface of the wall structure of FIG. 7;

FIG. 27 is a perspective view of the wall structure of FIG. 26 showing the rear surface of the wall structure with a respective lower wallboard panel and a respective upper wallboard panel, the rear surface of the wall structure constructed in a similar manner to the construction of the front surface of the wall structure as illustrated in FIGS. 17-26;

FIG. 28 is a perspective view of a wall structure in accordance with another embodiment disclosed herein incorporating a separate horizontal wallboard engagement strap between each pair of adjacent wall studs;

FIG. 29 is an enlarged perspective view of two of the horizontal wallboard engagement straps of FIG. 28 taken within the area—29—of FIG. 28 showing one of the engagement straps forced into the edge of the wallboard panel and showing the other engagement strap in position prior to be forced into the wallboard panel;

FIG. 30 is a further enlarged perspective view of the rightmost horizontal wallboard engagement strap of FIG. 29 taken within the area—30—of FIG. 29 to show one of the engagement tabs in further detail;

FIG. 31 is a perspective view of a second embodiment of an engagement tab having a modified configuration for the upper and lower edges of the crosspiece;

FIG. 32 is a perspective view of third embodiment of an engagement tab having a modified configuration for the upper and lower edges of the crosspiece; and FIG. 33 is a perspective view of a fourth embodiment of an engagement tab having a modified configuration for the crosspiece.

DESCRIPTION OF ILLUSTRATED EMBODIMENTS

As used throughout this specification, the words "upper," "lower," "longitudinal," "upward," "downward," "proximal," "distal," and other similar directional words are used with respect to the views being described. It should be understood that the percussive massage applicator described herein can be used in various orientations and is not limited to use in the orientations illustrated in the drawing figures.

The metal framing 110 of a wall structure 100 is illustrated in FIG. 1. The framing of the wall structure comprises a steel U-shaped lower channel 112, and a steel U-shaped upper channel 114 and a plurality of vertical C-shaped steel studs 116 extending from the lower channel to the upper channel. The lower end of each stud is secured to the lower channel and the upper end of each stud is secured to the upper channel. The studs are secured in a conventional manner using sheet metal screws (not shown) or other suitable fasteners. In the illustrated embodiment, the U-shaped channels and the C-shaped steel studs comprise 20 gauge galvanized steel; however, with suitable modifications, the framing elements may comprise thinner steel (e.g., 22 gauge) or thicker steel (e.g., 18 gauge up to 12 gauge) or other material.

Figure 2:
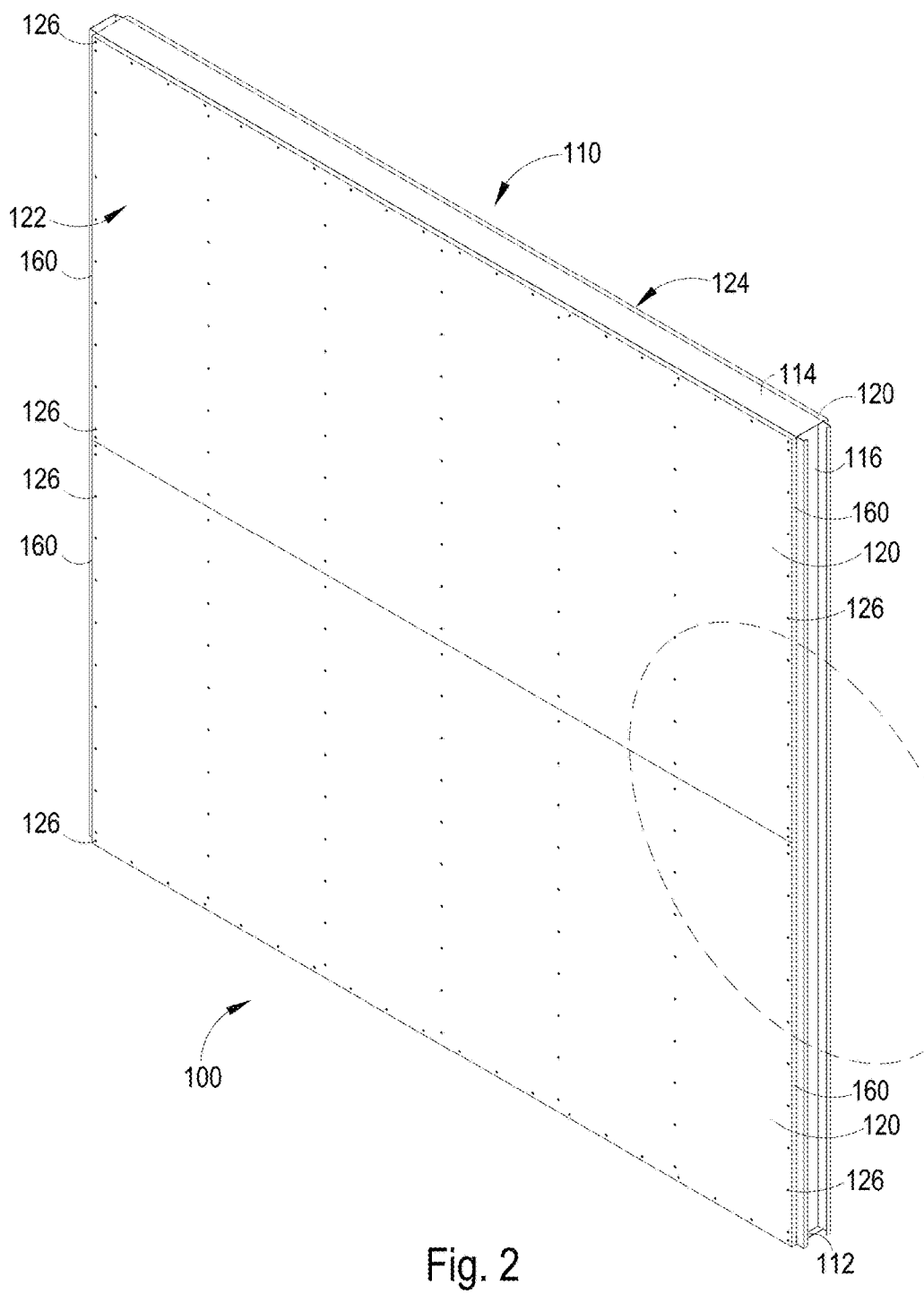
FIG. 2 is a perspective view of a wall structure incorporating the metal framing of FIG. 1 and a plurality of wallboard panels fastened to the metal framing.

As shown in FIG. 2, a plurality of wallboard panels 120 are secured to the front of the metal framing 110 of the wall structure 100 (as viewed in FIG. 2) to form an front surface 122 of the wall structure. A corresponding plurality of wallboard panels are secured to the back of the framing to form a rear surface 124 of the wall structure. Only the top edge of an upper wallboard panel can be seen on the rear surface in FIG. 2. It should be understood that the rear surface of the wall structure can be substantially identical to the front wall surface in the illustrated embodiment. In other embodiments, the rear surface may comprise a different structure.

In the illustrated embodiment, the wallboard panels 120 are 48-inch by 96-inch (4-foot by 8-foot) panels, which are positioned on the framing 110 with the longer dimension oriented horizontally and with the shorter dimension oriented vertically. The wallboard panels are "stacked" vertically on the framing. In the illustrated example, two wallboard panels are stacked to form an 8-foot wall. Additional wallboard panels (or partial panels) can be stacked vertically to form taller walls. Additional wallboard panels may be positioned horizontally adjacent to the illustrated wallboard panels for form a longer wall. As shown in the FIG. 2, the wallboard panels are secured to the vertical studs 116, the lower channel 112 and the upper channel 114 by a plurality of drywall screws 126. The drywall screws have threads selected for engaging metal framing.

Figure 3:
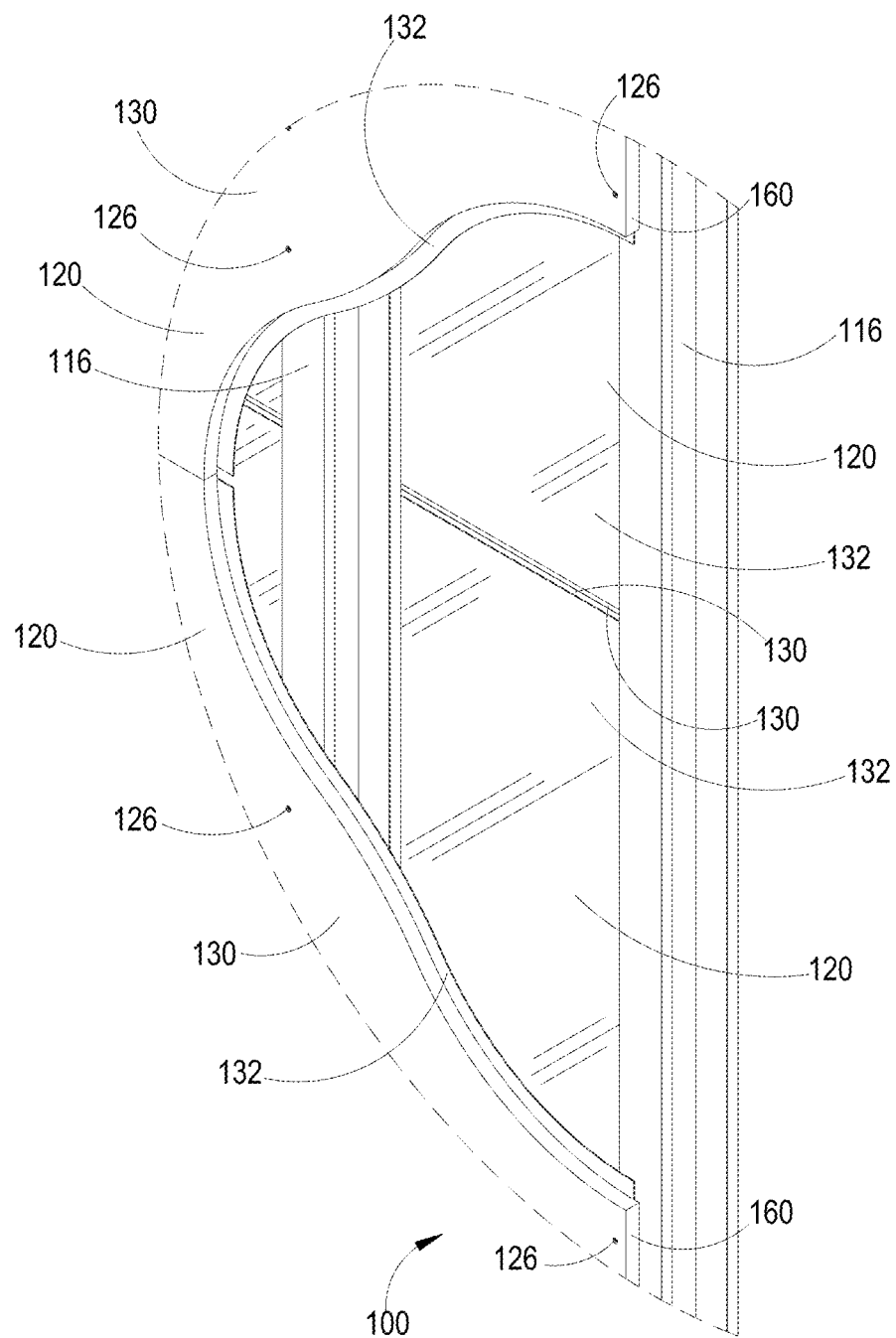
FIG. 3 is an enlarged perspective view of a portion of the wall structure of FIG. 2 taken within the area—3—in FIG. 2 with the front portion of the wall structure partially broken to show the wallboard panels in more detail.
Figure 5:
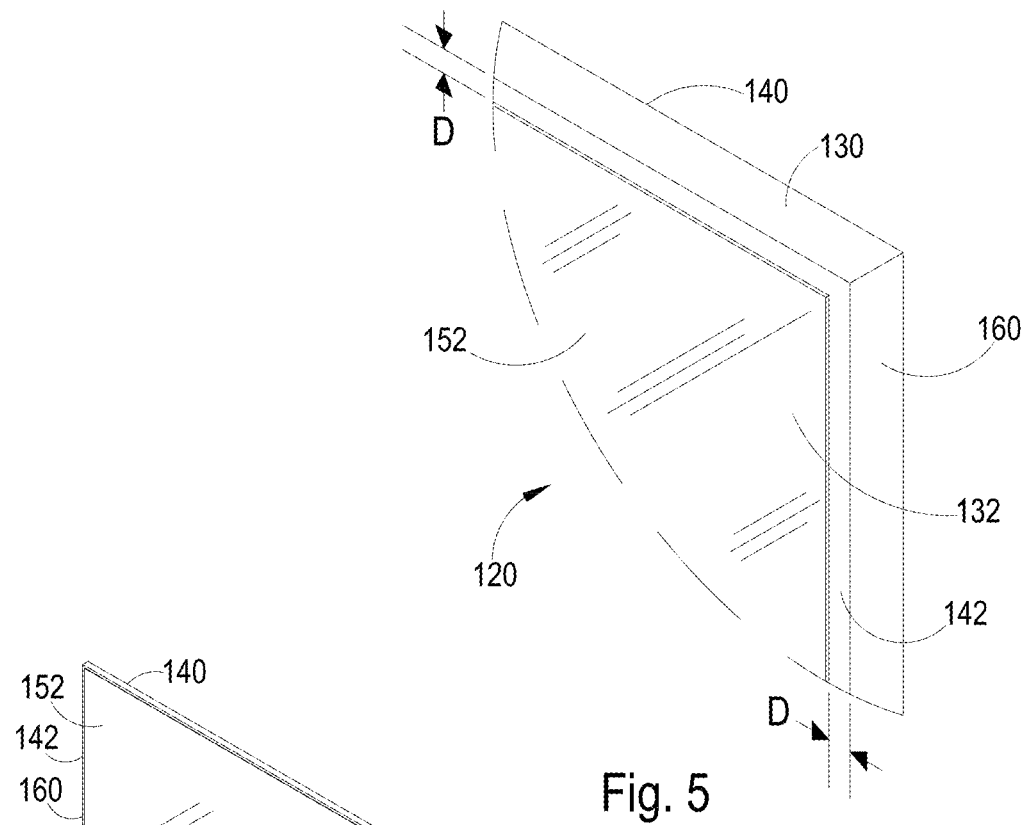
FIG. 5 is an enlarged perspective view of the wallboard panel of FIG. 4 taken within the area—5—in FIG. 4 showing the offset of the edges of the metal sheet from the edges of the drywall sheet.
Figure 4:
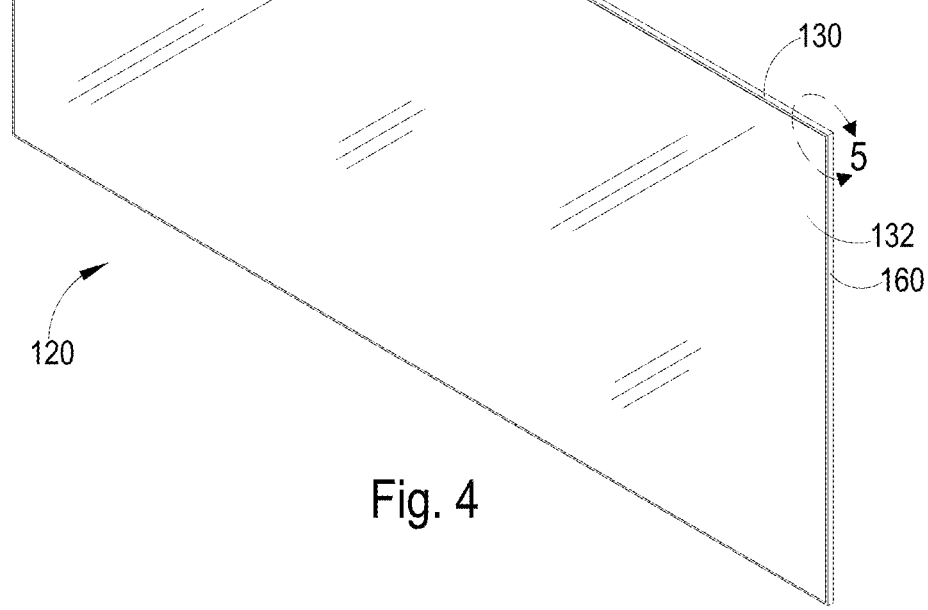
FIG. 4 is a perspective view one of the wallboard panels of FIGS. 2 and 3 showing the metal sheet adhesively attached to the drywall (gypsum board) sheet.
Figure 6:
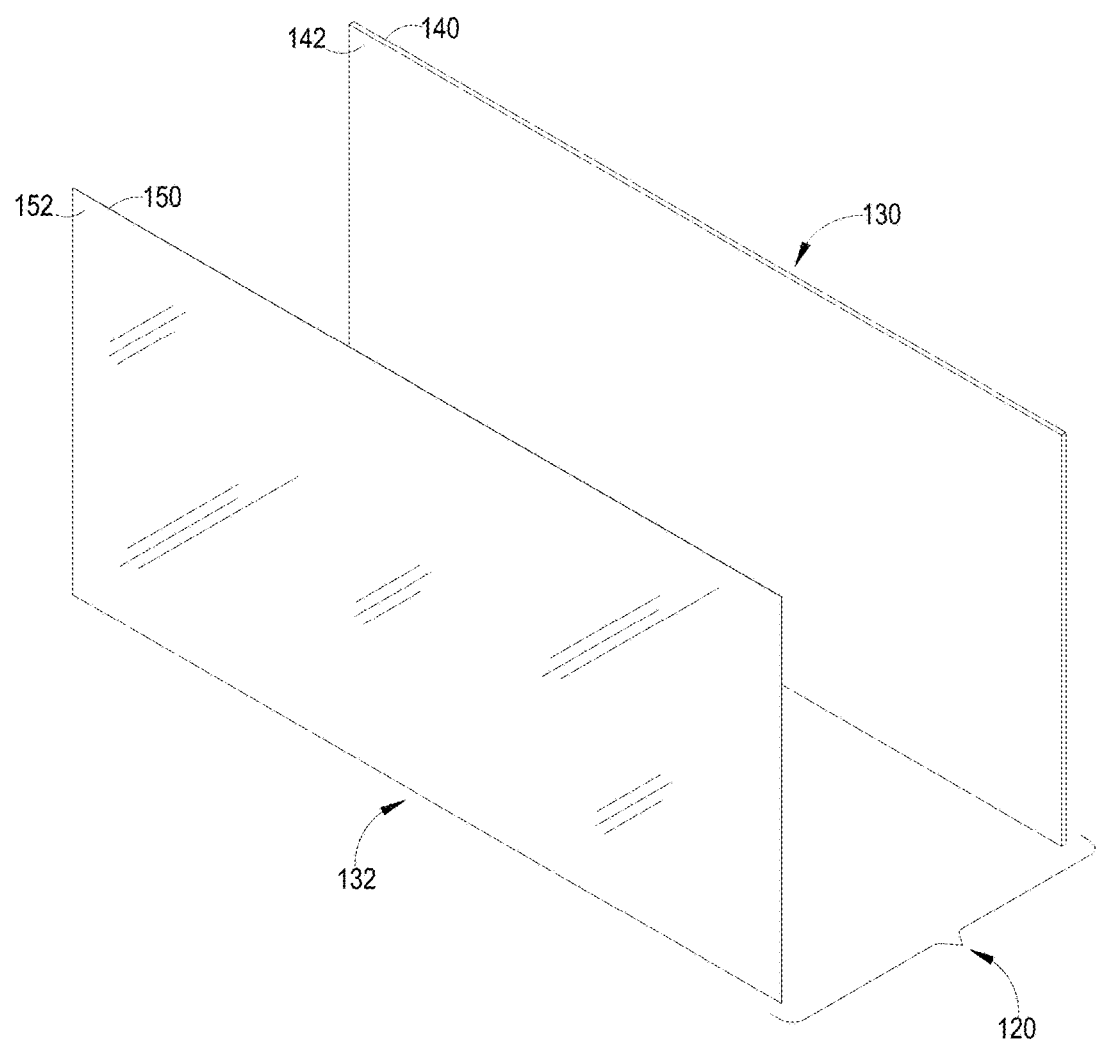
FIG. 6 is an exploded perspective view of the wallboard panel of FIG. 4.

As shown in the enlarged view in FIG. 3, each wallboard panel 120 in the illustrated embodiment, comprises a metal-backed wallboard panel. The wallboard panel is shown in more detail in FIGS. 4-6. The wallboard panel comprises a first layer 130 and a second layer 132. As discussed above, the wallboard panel may be constructed in accordance with the teachings of U.S. Pat. No. 5,768,841, which is incorporated herein by reference in its entirety.

The first layer 130 of the wallboard panel 120 comprises a conventional drywall sheet, which may also be referred to as gypsum board or plasterboard. The drywall sheet has a first surface 140 and a second surface 142. In the illustrated embodiment, the first and second surfaces of the drywall sheet have planar dimensions of approximately 48 inches (4 feet) by 96 inches (8 feet). The drywall sheet has a thickness between the first surface and the second surface selected for a particular application. In the illustrated embodiment, the thickness of the drywall sheet is approximately ⅝ inch.

The second layer 132 of the wallboard panel 120 comprises a thin metal sheet, such as, for example, a sheet of galvanized steel. The metal sheet has a first surface 150 and a second surface 152. The metal sheet has a selected thickness between the first and second surface. For example, in the illustrated embodiment, the metal sheet comprises 20 gauge steel having a thickness of approximately ³⁄₈₀ inch (0.0375 inch). The first surface of the metal sheet is adhesively secured to the second surface 142 of the drywall sheet 130 under pressure to permanently attach the metal sheet to the drywall sheet. When the wallboard panel is installed, the second surface of the metal sheet is positioned adjacent the metal framing 110, and the first surface of the drywall sheet is exposed as part of one of surfaces of the wall structure.

In the illustrated embodiment, the second layer (metal sheet) 130 of the wallboard panel 120 has dimensions selected to be smaller than the dimensions of the first layer (drywall sheet) 130 to cause the edges of the metal sheet to be recessed from the edges of the drywall sheet by a selected distance. For example, the dimensions of the metal sheet may be 47.5 inches by 95.5 inches so that when the metal sheet is centered on the back surface of the drywall sheet, the edges of the metal sheet are offset inwardly from the edges of the drywall sheet by a distance D as shown more clearly in the enlarged view of FIG. 5. In the illustrated embodiment, the distance D is approximately 0.25 inch.

When the wallboard panels 120 are installed on the frame 110 of the wall structure 100 as shown in FIG. 2, vertical edges 160 of each wallboard panel are aligned with one of the vertical studs 116. Ideally, each wallboard panel is positioned on the stud with the vertical edge of the first layer 130 (e.g., the drywall sheet) positioned on or near the vertical centerline of a stud. Thus, a respective portion of a horizontally adjacent wallboard panel (not shown) may be secured to the flange of the same stud. Each wallboard panel is further secured to the vertical studs between the two vertical edges of the wallboard panel. For example, in the illustrated embodiment of an 8-foot wall section, each wallboard panel is secured to two end studs and to five intermediary studs. The lower horizontal edge of the lower wallboard panel is secured to the lower U-shaped channel 112. The upper horizontal edge of the upper wallboard panel is secured to the upper U-shaped channel 114. If a third middle tier of wallboard panels (not shown) is included to create a taller wall, neither the upper edge nor the lower edge of the middle tier of wallboard panels will be secured in the illustrated conventional construction.

The vertical edges of the wallboard panels 120 are secured to the vertical studs 116, the lowermost horizontal edge of the lower wallboard panel is secured to the lower channel 112, and the uppermost horizontal edge of the upper wallboard panel is secured to the upper channel 113; however, the horizontal edges between vertically adjacent wallboard panels are not secured in the conventional wall structure 100 shown in FIGS. 1-5 except at each stud location. Thus, for example, in a wall structure where the vertical studs are spaced apart by 16 inches center-to-center and where the flanges of the vertical studs extend 2 inches, the horizontal edges span a distance of approximately 14 inches without support. In a wall where the studs are spaced apart by 24 inches center-to-center, the horizontal edges span a distance of approximately 22 inches without support. Furthermore, although a horizontal seam between the respective first surfaces 140 of the drywall panels 130 of vertically adjacent wallboard panels is conventionally sealed by drywall tape and drywall compound, the horizontal seam between the respective second surfaces 142 of the drywall panels is not sealed in any manner.

Figure 8:
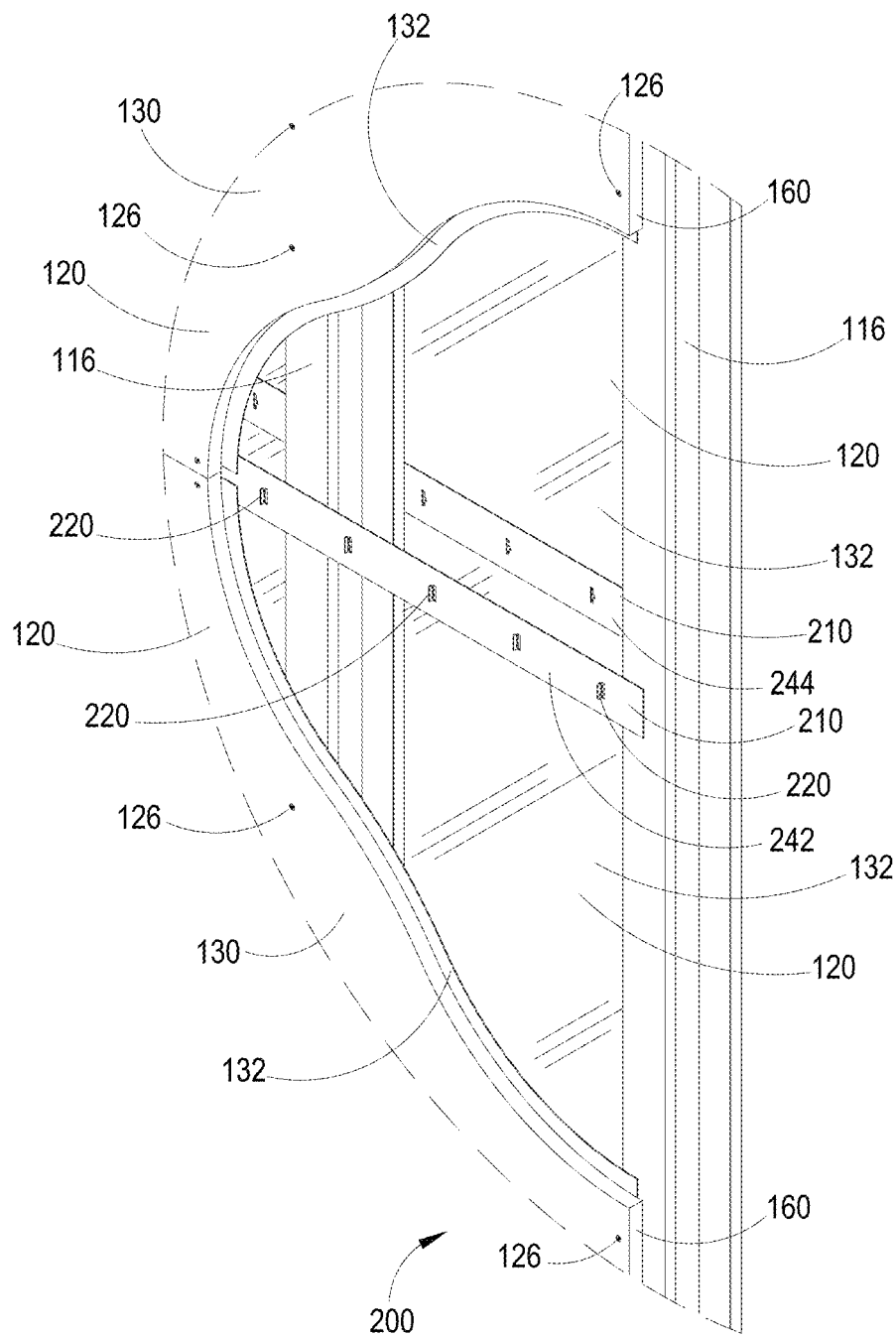
FIG. 8 is an enlarged perspective view of a portion of the wall structure of FIG. 7 taken within the area—8—in FIG. 7 with the front portion of the wall structure partially broken to show the wallboard panels and the horizontal wallboard engagement strap in more detail.
Figure 12:
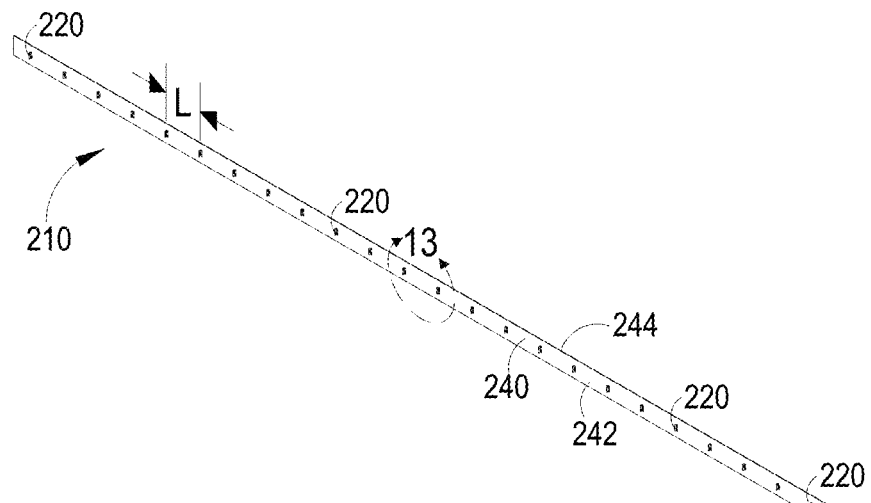
FIG. 12 is a perspective view of a length of the horizontal wallboard engagement strap showing the spacing of the engagement tabs along the strap.
Figure 13:
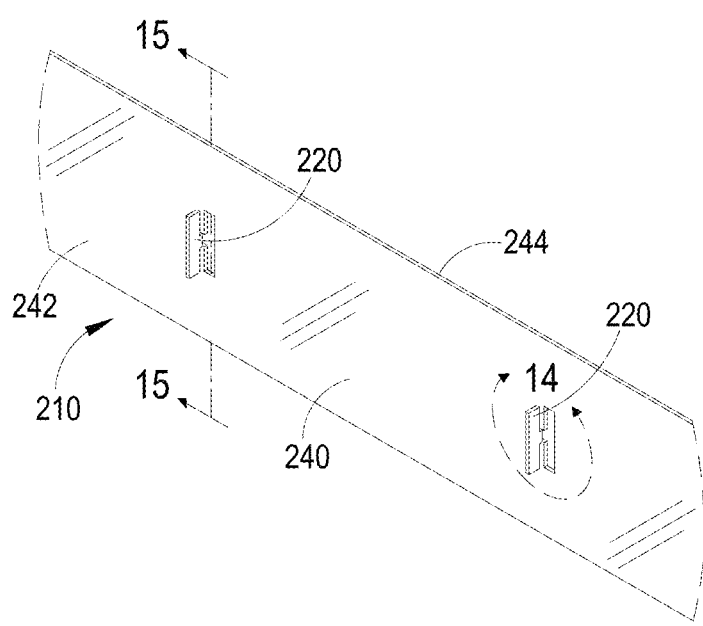
FIG. 13 is an enlarged perspective view of the horizontal wallboard engagement strap of FIG. 12 taken within the area—13—of FIG. 12 to show two adjacent engagement tabs in more detail.

FIG. 7 illustrates an improved wall structure 200, which solves the foregoing problems caused by the lack of support of the horizontal edges of the wallboard panels 120 between adjacent vertical studs 116. The wall structure of FIG. 7 is based on a similar framing structure 110 as described above, and like elements are numbered accordingly. As shown in the partially broken enlarged view in FIG. 8, the improved wall structure includes a horizontal wallboard engagement strap 210 to interconnect vertically adjacent wallboard panels 120, to support the edges of the wallboard panels proximate to the horizontal seams, and to seal the seams between the respective second surfaces 142 of the drywall panels 130. The engagement strap is positioned behind an upper portion of the lower wallboard panel proximate to a horizontal seam and behind a lower portion of the upper wallboard panel at the same horizontal seam. In the illustrated embodiment, a corresponding engagement strap 210 is provided for the rear portion of the wall.

As shown in FIGS. 12-16, the engagement strap 210 includes a plurality of spaced apart engagement tabs 220 that engage the second layer (thin metal sheet) 132 of each wallboard panel 120 as described below. The tabs prevent the horizontal edges of the wallboard panels from moving perpendicularly with respect to the strap and thus prevent the horizontal edges of the wallboard panels from moving with respect to each other in the perpendicular direction. The tabs are configured to secure the exposed surfaces of the respective thin metal sheets firmly against the strap to form a seal over the horizontal seam between the respective second surfaces 142 of the drywall panels 130 of two vertically adjacent wallboard panels.

The engagement strap 210 comprises a thin sheet 240 of metal (e.g., a sheet of galvanized steel) having a first (front) surface 242 and a second (rear) surface 244. In the illustrated embodiment, the sheet comprises 20 gauge material having a nominal thickness of approximately 3/80 inch (approximately 0.0375 inch). The sheet has a width (height in the view of FIG. 12) of approximately 2-3 inches (2 inches in the illustrated embodiment). The sheet may have various lengths. In the illustrated embodiment, the sheet has a length of 96 inches (8 feet).

In the illustrated embodiment, adjacent engagement tabs 220 are spaced apart by a distance L of approximately 4 inches. Each of the first and last engagement tabs on each sheet 240 forming the engagement strap is approximately 2 inches from the respective end of the sheet such that when two engagement straps are abutted on a wall, the distance between adjacent engagement tabs on adjacent engagement straps remains at approximately 4 inches. The engagement tabs may be spaced up to approximately 8 inches apart in other embodiments. When the engagement tabs are spaced 8 inches apart, each of the first and last tabs on each sheet are located approximately 4 inches from the respective end of the sheet to maintain the 8-inch spacing of the tabs on adjacent sheets.

Figure 16:
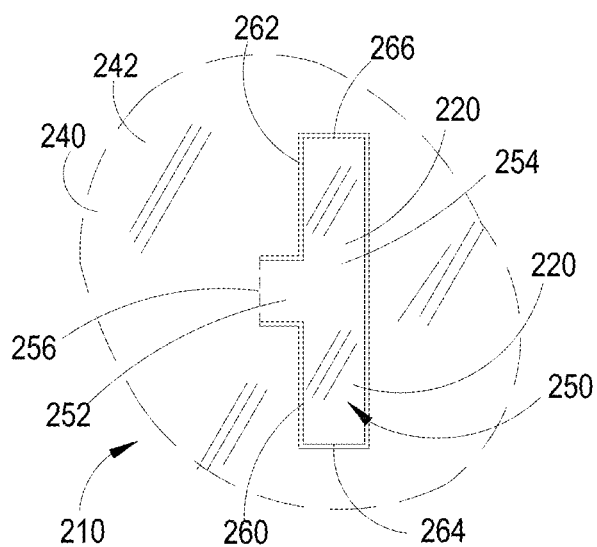
FIG. 16 is a front elevational view of a portion of the horizontal wallboard engagement strap of FIG. 12 showing the strap after an engagement tab is punched out or otherwise formed in the strap but before the engagement tab is bent outward to the position shown in FIGS. 14 and 15.

As shown in FIG. 16, each engagement tab 220 is formed by punching a selected shape 250 through the sheet 240. As illustrated, the punched shape has the general shape of a short capital "T" having a stem 252 and a crosspiece 254 perpendicular to the stem. The stem is aligned with a longitudinal length of the sheet. The crosspiece is perpendicular to the stem in the direction of the width of the sheet. As represented by a dashed line, the stem of the T has a base 256 that remains connected to the metallic sheet.

Figure 14:
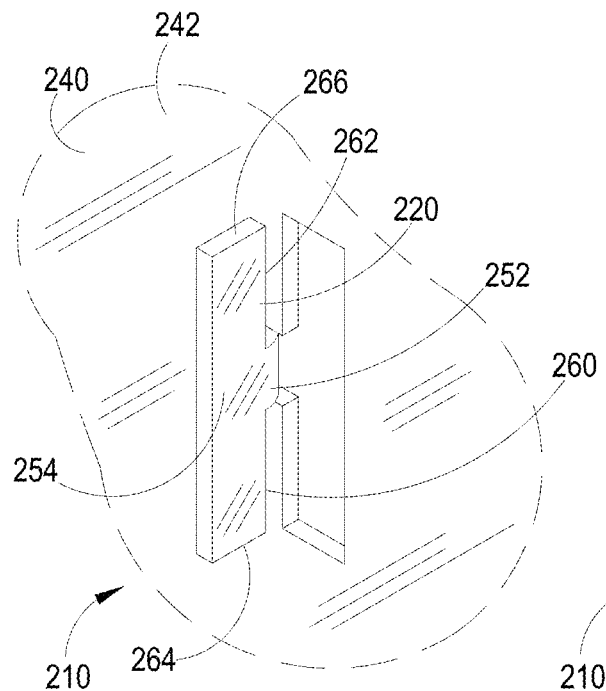
FIG. 14 is a further enlarged perspective view of the horizontal wallboard engagement strap of FIG. 13 taken within the area—14—of FIG. 14 to show one of the engagement tabs in further detail.
Figure 15:
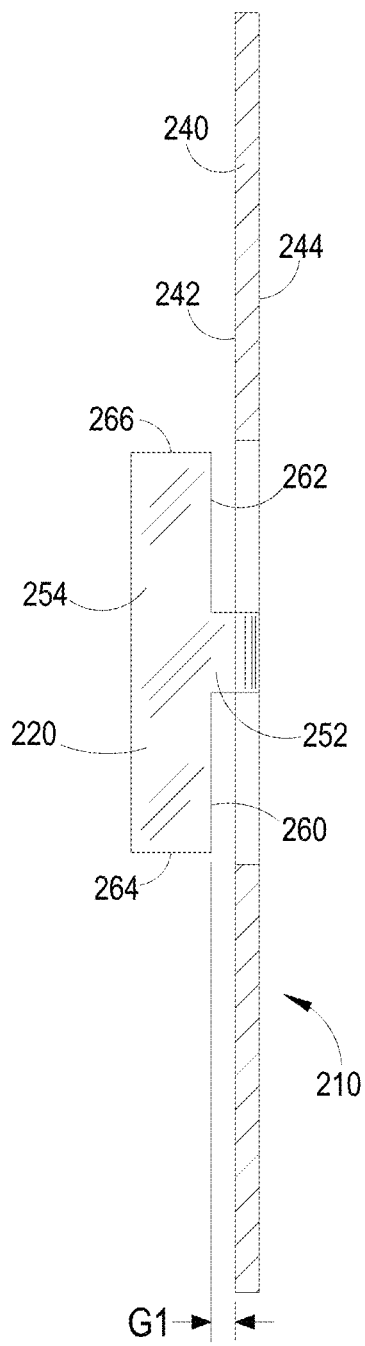
FIG. 15 is a cross-sectional right elevational view of the horizontal wallboard engagement strap of FIG. 13 taken along the line 15-15 in FIG. 13 to show one of the engagement tabs in further detail, the section line passing to the right of the engagement tab in FIG. 13 such that the engagement tab is not sectioned.

As shown in FIGS. 14 and 15, the engagement tab 220 of FIG. 16 is bent outward such that at least a portion of the stem 252 extends substantially perpendicularly from the first (front) surface 242 of the sheet 240 of the engagement strap 210. As used herein, "substantially perpendicularly" may range from +25 degrees to −25 degrees from 90 degrees with respect to the first surface of the sheet. The angle may be adjusted as needed to achieve the desired gap described below. A first engagement edge 260 and a second engagement edge 262 of the crosspiece are positioned substantially parallel to the first surface of the sheet at a selected distance G1 from the first surface. The distance G1 is selected based on the thickness of the second layer (thin metal sheet) 132 of the wallboard panel 120. For example, in the illustrated embodiment, the distance G1 is selected to be approximately 3/80 inch (approximately 0.0375 inch), which corresponds to the approximate thickness of 20 gauge steel. The distance G1 may be modified to accommodate a second layer having a different thickness. For example, the distance G1 may be increased to approximately 7/64 inch (approximately 0.1094 inch) to accommodate 12 gauge steel. The crosspiece has a lower edge 264 and an upper edge 266, which extend perpendicularly to the first surface of the sheet.

The stem 252 of the engagement tab 220 has a width selected to be no more than twice the inward offset of the edges of second layer (thin metal sheet) 132 with respect to the edges of the first layer (drywall sheet) 130 of the wallboard panel 120. As described above, the metal edges are offset inwardly by approximately 0.25 inch. Thus, the stem has a width less than 0.5 inch. In one embodiment, the width varies from approximately 0.125 inch to approximately 0.25 inch. The width of the crosspiece 254 of the engagement tab between the lower edge 264 and the upper edge 266 along the vertical axis of the crosspiece is selected such that the first engagement edge 260 and the second engagement edge 262 of the crosspiece extend a sufficient distance to assure engagement with the second surface of the metal second layers of adjacent wallboard panels when the first (drywall sheet) layers of the wallboard panels are abutted as shown in the cross-sectional view in FIG. 11. Thus, the crosspiece has a minimum length selected to be greater than 0.5 inch. The crosspiece has a length between 0.5 inch and 1 inch. In the illustrated embodiment, the crosspiece has a length of approximately 0.625 inch.

The wall structure 200 of FIGS. 7-16 is assembled by first securing a wallboard panel 120 to the lower U-channel 112 and the lower portions of the vertical studs 114 as illustrated by a first step shown in FIG. 17. Initially, the lower wallboard panels are only partially secured by omitting the drywall screws 126 that would otherwise secure the upper few inches of the wallboard panels to the vertical studs. For example, the screws for at least the upper two inches of each wallboard panel are omitted in this first step.

In a second step shown in FIGS. 18-20, the engagement strap 210 is inserted between the upper edge of the lower wallboard panel 120 and the vertical studs 116. The omitted drywall screws 126 allow the wallboard panel to flex sufficiently to allow the strap to be inserted. In the illustrated example, the engagement strap is selected to have the same length as the horizontal length of the wallboard panel and is aligned with the two vertical edges 160 of the wallboard panel. The engagement strap may also be installed to cross the vertical seam between adjacent horizontal wallboard panels. The length of the engagement strap may be varied for certain installations.

As shown in the enlarged views in FIGS. 19 and 20, the engagement strap 210 is initially inserted with the rear surface 244 of the strap against the vertical studs 116 and with the front surface 242 of the strap against the exposed second surface 152 of the second layer (thin metal sheet) 132 of the wallboard panel. Thus, the strap is positioned between the wallboard panel and the vertical studs. The strap is inserted until the lower edges 264 of the crosspieces 254 of the engagement tabs 220 are positioned proximate to the upper edge of the drywall sheet of the wallboard panel as shown in FIG. 20. In this configuration, the strap is substantially parallel to the upper edge of the wallboard panel.

As shown in FIGS. 21-23, the engagement strap 210 is then forced vertically downward to drive the lower edges 264 of the crosspieces 254 of the engagement strap into the first layer (drywall sheet) 130. A straight edge tool (not shown) or a similar device may be used to apply uniform force along the length of the engagement strap to assure that the plurality of engagement tabs are driven into the drywall sheet with substantially the same force to maintain the parallel configuration of the engagement strap with respect to the upper edge of the wallboard panel. The engagement tabs are driven into the upper edge of the wallboard panel until the longitudinal center of the engagement strap is substantially aligned with the upper edge of the drywall sheet of the wallboard panel. This alignment assures that the second layer (thin metal sheet) 132 of the wallboard panel is squeezed between the first engagement edge 260 of the crosspiece and the first surface 242 of the sheet 240 that forms the engagement strap as shown, for example, in the cross-sectional view in FIG. 11. After the proper horizontal alignment of the engagement strap and the upper edge of the wallboard panel is verified, the drywall screws 126 may be installed to secure the upper portion of the lower wallboard panel along with the underlying engagement strap to the vertical studs 116. Additional drywall screws may also be inserted through the wallboard panel in the regions between the vertical studs to further secure the wallboard panel to the engagement strap. This further securing portion of this step may be deferred until after the installation of the upper wallboard panel, as described below, and the upper row of drywall screws is not shown in FIGS. 21 and 22.

As shown in FIG. 24, an upper wallboard panel 120 is installed above the previously installed lower wallboard panel by positioning the upper wallboard panel above the engagement tabs 220 of the previously installed engagement strap 210. A lower edge of the upper wallboard panel is positioned parallel to the upper edge of lower wallboard panel with the lower edge of the upper wallboard panel in contact with the upper edges 266 of the crosspieces 254 of the engagement tabs of the engagement strap. As illustrated by a gap G2 in FIG. 24, the lower edge of the upper wallboard panel is initially offset from the upper edge of the lower wallboard panel because of the offset of the upper edges of the crosspieces.

After the upper wallboard panel 120 is positioned parallel to the upper edges of the crosspieces 254 of the engagement tabs 220, additional pressure is applied to the upper wallboard panel to force the first layer (drywall panel) 130 of the upper wallboard panel onto the crosspieces of the engagement tabs until the lower edge of the upper wallboard panel substantially abuts the upper edge of the lower wallboard panel as shown in FIG. 25. In this position, the second (thin metal sheet) 132 of the upper wallboard panel is squeezed between the second engagement edge 262 of the crosspiece and the first surface 242 of the sheet 240 that forms the engagement strap as shown in the cross-sectional view in FIG. 11.

After positioning the upper wallboard panel 120 onto the engagement strap 210 as shown in FIG. 25, the upper wallboard panel is secured to the vertical studs 116 using the drywall screws 126 as shown in FIG. 26. For a lower portion of the upper wallboard panel (e.g., approximately one inch of the panel proximate to the lower edge), the drywall screws penetrate the wallboard panel and the engagement strap. The lower portion of the upper wallboard panel is also secured to the engagement strap in the regions between adjacent vertical studs. If not already completed when installing the lower wallboard panel, the corresponding upper portions of the lower wallboard panel are also secured to the engagement strap in the regions between adjacent vertical studs. When fully secured, the first surface 122 of the wall structure 200 corresponds to the first surface shown in FIG. 7.

As shown in FIG. 27, the second surface 124 of the wall structure 200 is constructed using the same steps as described above for the first surface 122

The two horizontal wallboard engagement straps 210 of the completed wall structure 200 seal the inner seam between vertically a wallboard panels from moving with respect to each other in the regions between adjacent vertical studs 116.

Although described with respect to 20 gauge steel wall framing and with respect to 20 gauge metal backing on the wallboard panels 120, it should be understood that the system and method can be readily adapted to thicker and thinner gauge metals and can be adapted to wall structures wherein the gauge of the steel framing differs from the gauge of the metal backing of the wallboard panels. For thicker gauge reinforcement straps 210, the reinforcement straps may be cut to fit between adjacent vertical studs. For example, with 16-inch center-to-center vertical studs with two-inch flanges, the reinforcement straps may be cut to 14 inches to provide a tight fit between adjacent vertical studs as illustrated in FIGS. 28-30. As shown for a partially constructed wall structure 300 in FIG. 28, six engagement straps 310A-310F are each configured to have a length corresponding to the distance between the web of one wall stud 116 and the lip of an adjacent wall stud. In the illustrated embodiment, each engagement strap has four engagement tabs 320. Each of the engagement tabs comprises a stem 352 and a crosspiece 354 as described above. Each crosspiece has a first (lower) engagement edge 360 and a second (upper) engagement edge 362. Each crosspiece has a lower edge 362 and an upper edge 364. Five of the engagement straps, 310A-310E, are shown in their respective final positions with the lower edges of the crosspieces of the engagement tabs forced into the first layer (drywall sheet) 130 of the lower wallboard panel. The sixth engagement strap 310F is shown with the lower edges of the crosspieces of the engagement tabs resting on the edge of the lower wallboard panel but with the lower portion of the crosspiece not yet forced into the wallboard panel. After each engagement strap is positioned, the wallboard panel is secured to the engagement strap by a plurality of drywall screws 126. When an upper wallboard panel (not shown) is installed on the wall structure, the lower edge of the upper wallboard panel is forced onto the crosspieces of the engagement straps, and the upper wallboard panel is then secured to the engagement straps as described above.

The engagement tabs 220 of the engagement strap 210 and the engagement tabs 320 of the engagement straps 310A-310F have respective rectangular configurations. The engagement tabs may also have other configurations. For example, FIG. 31 illustrates an engagement tab 420 for an engagement strap 410 which extends from a first surface 442 of a sheet 440. The engagement strap may correspond to the longer engagement strap of FIG. 12 or may correspond to the shorter engagement straps 310A-310F of FIG. 28. Accordingly, only the enlarged perspective view of the engagement tab is illustrated in FIG. 31. The engagement tab has a stem 452 and a crosspiece 454 as described above. The crosspiece has a lower engagement edge 460 and an upper engagement edge 462 corresponding to the previously described edges. The crosspiece as a lower edge 464 and an upper edge 466. Unlike the previously described lower and upper edges, each of the lower and upper edges of the crosspiece shown in FIG. 31 is tapered to form an acute vertex at the respective engagement edge. The acute vertices may reduce the force needed to insert the upper and lower edges into the first layer (drywall sheet) of the wallboard panels 120.

As a further example, FIG. 32 illustrates an engagement tab 520 for an engagement strap 510 which extends from a first surface 542 of a sheet 540. The engagement strap may correspond to the longer engagement strap of FIG. 12 or may correspond to the shorter engagement straps 310A-310F of FIG. 28. Accordingly, only the enlarged perspective view of the engagement tab is illustrated in FIG. 32. The engagement tab has a stem 552 and a crosspiece 554 as described above. The crosspiece has a lower engagement edge 560 and an upper engagement edge 562 corresponding to the previously described edges. The crosspiece has a lower edge 564 and an upper edge 566. Unlike the previously described lower and upper edges, each of the lower and upper edges of the crosspiece shown in FIG. 32 is rounded. The rounded edges may reduce the force needed to insert the upper and lower edges into the first layer (drywall sheet) of the wallboard panels 120.

As a further example, FIG. 33 illustrates an engagement tab 620 for an engagement strap 610 which extends from a first surface 642 of a sheet 640. The engagement strap may correspond to the longer engagement strap of FIG. 12 or may correspond to the shorter engagement straps 310A-310F of FIG. 28. Accordingly, only the enlarged perspective view of the engagement tab is illustrated in FIG. 33. The engagement tab has a stem 642 and a crosspiece 654 as described above. The crosspiece has a lower engagement edge 660 and an upper engagement edge 662, which unlike the previously described lower and upper engagement edges are not vertical. Rather, the lower engagement edge extends at a first angle from a proximal end at the stem to a distal end at a lower vertex 664. The upper engagement edge extends at a second angle from a proximal end at the stem to a distal end at an upper vertex 666. The lower and upper vertices may reduce the force needed to insert the engagement tab into the first layer (drywall sheet) 132 of the wallboard panel 120. The angled lower and upper vertices of the engagement tab may assist in drawing the second layer (thin metallic sheet) of the wallboard panel 120 against the engagement strap when the engagement tab is inserted into the wallboard panel.

As various changes could be made in the above constructions without departing from the scope of the invention, it is intended that all the matter contained in the above description or shown in the accompanying drawings shall be interpreted as illustrative and not in a limiting sense.

What is claimed is:

1. A system for securing adjacent edges of a first metal-backed wallboard panel and a second metal-backed wallboard panel on a wall structure the system comprising: a plurality of spaced-apart metal studs, first and second metal-backed wallboard panels, each wallboard panel comprising a drywall panel having a respective metal backing secured thereto, the metal backing of each wallboard panel having a first surface attached to the respective drywall panel and having a second surface parallel to the first surface, the metal backing having a backing thickness between the first surface and the second surface;

a strap having a first surface and a second surface, the strap having strap thickness between the first surface and the second surface, the strap having a length selected to extend at least between a first metal stud and a second metal stud, the strap including a plurality of partial cutouts, each partial cutout including a transverse portion and a stem portion, the transverse portion having a first engagement edge and a second engagement edge, the stem portion having a first end connected to the first engagement edge and the second engagement edge of the transverse portion and having a second end connected to the strap, the stem portion and the first and second engagement edges of the transverse portion having a common thickness the same as the strap thickness, the second end of the stem portion extending substantially vertically from the first surface of the strap such that each of the first engagement edge and the second engagement edge of the transverse portion is spaced apart from the first surface of the strap by at least a selected gap distance, the selected gap distance being the same as the backing thickness.

2. The system as defined in claim 1 wherein the first engagement edge and the second engagement edge of the transverse portion are perpendicular to the stem portion and are parallel to the first surface of the strap.

3. The system as defined in claim 1 wherein each of the first engagement edge and the second engagement edge of the transverse portion extend at a respective angle with respect to the stem portion from a respective proximal end of the respective engagement edge at the stem portion to a respective distal end of the respective engagement edge, the respective proximal end of each of the first engagement edge and the second engagement edge spaced apart from the first surface of the strap by the selected gap distance, the respective distal end of each of the first engagement edge and the second engagement edge spaced apart from the first surface of the strap by a distance greater than the selected gap distance.

4. A strap for spanning between two adjacent metal-backed wallboard panels on a wall structure, each of the two adjacent wallboard panels comprising a drywall panel having a respective metal backing secured thereto, the metal backing of each wallboard panel having a first surface attached to the respective drywall panel and having a second surface parallel to the first surface, the metal backing having a backing thickness between the first surface and the second surface, the strap comprising:

a metal sheet having a first surface and a second surface, the metal sheet having a sheet thickness; and a plurality of punched-out tabs spaced apart along the first surface of the metal sheet, each tab comprising:

a stem portion having a proximal end attached to the metal sheet and having a distal end, the stem portion having a stem width and a stem thickness, the stem thickness the same as the sheet thickness, the proximal end of the stem having a bend such that the distal end of the stem extends substantially perpendicularly with respect to the first surface of the metal sheet; and an engagement portion extending bidirectionally transversely from the distal end of the stem portion, at least a portion of the engagement portion having a width greater than the stem portion, the engagement portion having a first engagement edge extending in a first direction from the distal end of the stem portion and having a second engagement edge extending in a second direction from the distal end of the stem portion, the second direction opposite the first direction, the first and second engagement edges spaced apart from the first surface of the metal sheet by at least a selected distance, the selected distance being the same as the backing thickness, the first and second engagement edges having an engagement edge thickness the same as the stem thickness.

5. The system as defined in claim 4 wherein the first engagement edge and the second engagement edge of the transverse portion are perpendicular to the stem portion and are parallel to the first surface of the strap.

6. The system as defined in claim 4 wherein each of the first engagement edge and the second engagement edge of the transverse portion extend at a respective angle with respect to the stem portion from a respective proximal end of the respective engagement edge at the stem portion to a respective distal end of the respective engagement edge, the respective proximal end of each of the first engagement edge and the second engagement edge spaced apart from the first surface of the strap by the selected gap distance, the respective distal end of each of the first engagement edge and the second engagement edge spaced apart from the first surface of the strap by a distance greater than the selected gap distance.

7. A method for closing a horizontal gap between two adjacent metal-backed wallboard panels on a wall structure, each wallboard panel including a drywall panel with a metal sheet adhesively secured to the drywall panel, the metal sheet having a metal sheet thickness, the method comprising:

positioning a first metal-backed wallboard panel on a first portion of the wall structure;

positioning an engagement strap on an upper horizontal edge of the first metal-backed wallboard panel, the engagement strap having a strap thickness from a first surface to a second surface of the engagement strap, the engagement strap including a plurality of punched out engagement tabs extending from the first strap surface, each engagement tab having a stem portion, a first transverse portion and a second transverse portion, the first transverse portion having a first engagement edge and the second transverse portion having a second engagement edge, each engagement edge having an engagement edge thickness the same as the strap thickness, each engagement edge spaced apart from the first strap surface by a gap distance at least as great as the metal sheet thickness, the engagement strap positioned with at least a portion of the first engagement edge of each engagement tab positioned adjacent the metal sheet of the first metal-backed wallboard panel with an edge of the metal sheet positioned between the first engagement edge and the strap surface, and with at least a portion of the first transverse portion inserted into the drywall panel of the first metal-backed wallboard panel; and positioning a lower horizontal edge of a second metal-backed wallboard panel on the engagement strap, the second metal-backed wallboard panel positioned with at least a portion of the second engagement edge of each engagement tab positioned adjacent the metal sheet of the second metal-backed wallboard panel with the metal sheet positioned between the second engagement edge and the strap surface, and with at least a portion of the second transverse portion inserted into the drywall panel of the second metal-backed wallboard panel.

8. The method as defined in claim 7 further comprising securing the first metal-backed wallboard panel and the second metal backed wallboard panel to the engagement strap with a plurality of screws.

9. The method as defined in claim 7 wherein the first engagement edge and the second engagement edge of the engagement tab are parallel to the strap surface.

10. The method as defined in claim 7 wherein each of the first engagement edge and the second engagement edge of the engagement tab is oriented at respective angles to the strap surface.

* * * * *